(12) United States Patent
Martin et al.

(10) Patent No.: US 11,330,815 B2
(45) Date of Patent: *May 17, 2022

(54) FOAM FORMULATIONS AND APPARATUS FOR DELIVERY

(71) Applicant: FMC Corporation, Philadelphia, PA (US)

(72) Inventors: Timothy M. Martin, Ringoes, NJ (US); Shawn Grant, Owensboro, KY (US); Neil Destefano, Southampton, NJ (US); Adam Prestegord, Holland, PA (US); Michael Harper, Columbia, MO (US)

(73) Assignee: FMC Corporation, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/885,424

(22) Filed: May 28, 2020

(65) Prior Publication Data

US 2020/0288705 A1 Sep. 17, 2020

Related U.S. Application Data

(60) Continuation of application No. 15/706,824, filed on Sep. 18, 2017, now Pat. No. 10,785,974, which is a division of application No. 14/502,251, filed on Sep. 30, 2014, now Pat. No. 10,834,921.

(60) Provisional application No. 61/893,003, filed on Oct. 18, 2013, provisional application No. 61/891,729, filed on Oct. 16, 2013, provisional application No. 61/884,369, filed on Sep. 30, 2013.

(51) Int. Cl.
| | |
|---|---|
| *A01N 25/16* | (2006.01) |
| *A01N 53/00* | (2006.01) |
| *B01F 23/232* | (2022.01) |
| *B01F 23/235* | (2022.01) |
| *A01N 25/22* | (2006.01) |
| *A01N 37/08* | (2006.01) |

(52) U.S. Cl.
CPC ............ *A01N 25/16* (2013.01); *A01N 25/22* (2013.01); *A01N 37/08* (2013.01); *A01N 53/00* (2013.01); *B01F 23/232* (2022.01); *B01F 23/235* (2022.01)

(58) Field of Classification Search
None
See application file for complete search history.

(56) References Cited

U.S. PATENT DOCUMENTS

| | | | |
|---|---|---|---|
| 3,165,114 A | 1/1965 | Garrett | |
| 3,879,550 A | 4/1975 | Berenson | |
| 3,922,977 A | 12/1975 | Lavo et al. | |
| 4,190,427 A * | 2/1980 | Ravallo | C05B 13/06 71/29 |
| 4,356,934 A | 11/1982 | Knake | |
| 4,405,779 A | 9/1983 | Wiley | |
| 4,436,905 A | 3/1984 | Bonse | |
| 4,638,926 A | 1/1987 | Brock | |
| 4,836,939 A | 6/1989 | Hendrickson | |
| 4,975,425 A | 12/1990 | Barnett, Jr. | |
| 5,096,903 A | 3/1992 | Uhr et al. | |
| 5,308,827 A | 5/1994 | Sakamoto et al. | |
| 5,460,106 A | 10/1995 | Crockett et al. | |
| 5,527,760 A | 6/1996 | Rensing et al. | |
| 5,798,316 A | 8/1998 | Theodoridis | |
| 5,816,502 A | 10/1998 | Sperry et al. | |
| 5,834,006 A | 11/1998 | Smith et al. | |
| 5,881,493 A | 3/1999 | Restive | |
| 6,071,858 A | 6/2000 | Modrcin et al. | |
| 6,155,185 A | 12/2000 | Memory et al. | |
| 6,159,903 A | 12/2000 | Linker et al. | |
| 6,180,088 B1 | 1/2001 | Ohtsubo et al. | |
| 6,214,771 B1 | 4/2001 | Dexter | |
| 6,289,829 B1 | 9/2001 | Fish et al. | |
| 6,651,908 B1 | 11/2003 | Borglum et al. | |
| 6,755,400 B2 | 6/2004 | Howe | |
| 6,990,911 B2 | 1/2006 | Schneider | |
| 7,022,651 B1 | 4/2006 | Lightcap, Jr. et al. | |
| 7,247,647 B2 | 7/2007 | Hughes et al. | |
| 7,370,589 B2 | 5/2008 | Wilkerson et al. | |
| 7,514,428 B2 | 4/2009 | Doller et al. | |
| 8,029,827 B2 | 10/2011 | Martin | |
| 8,969,554 B2 | 3/2015 | Shibayama et al. | |
| 2002/0043197 A1 | 4/2002 | Schaffert | |
| 2004/0071653 A1 | 4/2004 | Bratescu et al. | |
| 2004/0231575 A1 | 11/2004 | Wilkerson et al. | |
| 2005/0215433 A1 | 9/2005 | Benitez et al. | |
| 2006/0166898 A1 | 7/2006 | Chen | |

(Continued)

FOREIGN PATENT DOCUMENTS

| | | |
|---|---|---|
| CN | 1871913 A | 12/2006 |
| CN | 101179928 A | 5/2008 |

(Continued)

OTHER PUBLICATIONS

Eurasian Office Action dated Apr. 22, 2021, in related Eurasian Application No. 201990233, 4 pages.
Korean Office Action dated May 7, 2021 in related Korean Patent Application No. 2016-7011285. 10 pages.
"[Insecticide Application] Insecticidal Foams Require Knowledge and Precision", Robinson, PCT Magazine, Jun. 29, 2012; https://www.pctonline.com/article/pct-insecticides-water-based-foam/.
"Targeted Delivery of Pesticides Using Biodegradable Polymeric Nanoparticles", De et al., Jan. 2014, DOI: 10.1007/978-81-322-1689-6; ISBN: 978-81-322-1688-9; https://link.springer.com/book/10.1007/978-81-322-1689-6.

(Continued)

*Primary Examiner* — Melissa L Fisher
(74) *Attorney, Agent, or Firm* — Armstrong Teasdale LLP

(57) ABSTRACT

Foamable formulations of agriculturally active ingredients are provided, as well as methods for using them. The formulations allow improved delivery active ingredients by the ability to deliver high amounts of active ingredient with a low volume of formulation used.

26 Claims, 12 Drawing Sheets

(56) References Cited

U.S. PATENT DOCUMENTS

| | | |
|---|---|---|
| 2006/0178271 A1 | 8/2006 | Lynch et al. |
| 2007/0020304 A1 | 1/2007 | Tamarkin et al. |
| 2008/0206361 A1 | 8/2008 | Martin |
| 2010/0016160 A1 | 1/2010 | Bettarini et al. |
| 2010/0016163 A1 | 1/2010 | Keiper et al. |
| 2010/0179198 A1 | 7/2010 | Mertoglu et al. |
| 2010/0184599 A1 | 7/2010 | Parrish et al. |
| 2010/0204283 A1 | 8/2010 | Dairiki et al. |
| 2010/0260873 A1 | 10/2010 | Lindner et al. |
| 2010/0323897 A1 | 12/2010 | Burke |
| 2011/0070278 A1 | 3/2011 | Lopez |
| 2012/0087987 A1 | 4/2012 | Man et al. |
| 2012/0142533 A1 | 6/2012 | Richard et al. |
| 2012/0149570 A1 | 6/2012 | Burke et al. |
| 2012/0283103 A1 | 11/2012 | Groenewegen et al. |
| 2013/0123104 A1 | 5/2013 | McKnight et al. |
| 2015/0093426 A1 | 4/2015 | Martin et al. |

FOREIGN PATENT DOCUMENTS

| | | |
|---|---|---|
| CN | 101179938 A | 5/2008 |
| CN | 101677527 A | 3/2010 |
| CN | 102458126 A | 5/2012 |
| CN | 102595881 A | 7/2012 |
| CN | 102666477 A | 9/2012 |
| EP | 0400914 A1 | 12/1990 |
| EP | 0488668 A1 | 6/1992 |
| EP | 1449914 A1 | 8/2004 |
| GB | 1462560 A | 1/1977 |
| JP | H03-63201 A | 3/1991 |
| JP | H04-305502 A | 10/1992 |
| JP | H05-000904 A | 1/1993 |
| JP | H06-508997 A | 10/1994 |
| JP | H08-225414 A | 9/1996 |
| JP | 2004-195329 A | 7/2004 |
| JP | 2008-074659 A | 4/2008 |
| JP | 2008-531470 A | 8/2008 |
| JP | 2008-533190 A | 8/2008 |
| JP | 2009-521477 A | 6/2009 |
| JP | 2010-083797 A | 4/2010 |
| JP | 2012-525413 A | 10/2012 |
| JP | 2013014573 A | 1/2013 |
| JP | 2013-513663 A | 4/2013 |
| KR | 2012-0060780 A | 6/2012 |
| RU | 20116016 C1 | 7/1998 |
| RU | 2533900 C2 | 11/2014 |
| SU | 858601 A1 | 8/1981 |
| UA | 1985 A | 12/1997 |
| WO | 1985/01876 | 5/1985 |
| WO | 1985/01876 A1 | 5/1985 |
| WO | 96/016543 A2 | 6/1996 |
| WO | 1998/16106 A1 | 4/1998 |
| WO | 01/76352 A1 | 10/2001 |
| WO | 2001/076352 | 10/2001 |
| WO | 2001/089503 | 11/2001 |
| WO | 2006/066361 A1 | 6/2006 |
| WO | 2006/100227 A1 | 9/2006 |
| WO | 2006/124508 A1 | 11/2006 |
| WO | 2006128707 A1 | 12/2006 |
| WO | 2007/085899 A2 | 8/2007 |
| WO | 2008/000834 A1 | 1/2008 |
| WO | 2010/117740 A2 | 10/2010 |
| WO | 2010/129345 A2 | 11/2010 |
| WO | 2011025789 A2 | 3/2011 |
| WO | 2011/080208 A1 | 7/2011 |
| WO | 2012/035015 A2 | 3/2012 |
| WO | 2013/041975 A2 | 3/2013 |
| WO | 2013/043262 A2 | 3/2013 |
| WO | 2013/087430 A1 | 6/2013 |
| WO | 2013/135605 A1 | 9/2013 |
| WO | 2014/079813 A1 | 5/2014 |
| WO | 2014/118573 A1 | 8/2014 |
| WO | 2015/048757 A2 | 4/2015 |
| WO | 2016/209217 A1 | 12/2016 |

OTHER PUBLICATIONS

Third Party Observation submitted Mar. 30, 2016 relating to InterNotification of Transmittal of International Preliminary Report on Patentability dated Dec. 4, 2017 issued in PCT/US16/65564 (7 pages).national Patent Application No. PCT/US2014/068571 (5 pages).

Partial International Search Report dated Feb. 13, 2017 in International Patent Application No. PCT/US16/065564 (2 pages).

FMC Bifenthrin MSDS, http://www.fluoridealert.org/wp-content/pesticides/msds/bifenthrin.technical.pdf, accessed May 29, 2017.

Invitation to Pay Additional Fees (including partial International Search Report) dated Dec. 17, 2014 in connection with International Patent Application No. PCT/US2014/058340 (6 pages).

Stepan company, NINEX® MT630F, http://www.stepan.com/products/Surfactants/NINEX%C2%AEMT630F.aspx, Accessed 2017.

International Search Report and Written Opinion issued in connection with International Application No. PCT/US2015/037327 dated Sep. 2, 2015 (14 pages).

Zaoxiang Wang, "Pesticide processing series, pesticide auxiliaries", Chemical Industry Publishing, 1994, pp. 674-680, English abstract.

\* cited by examiner

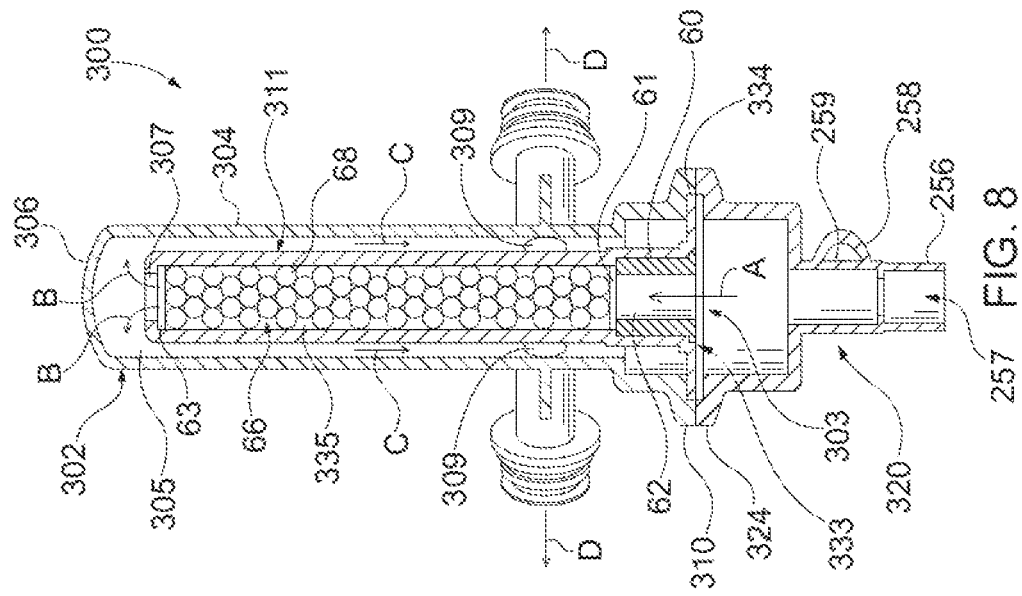

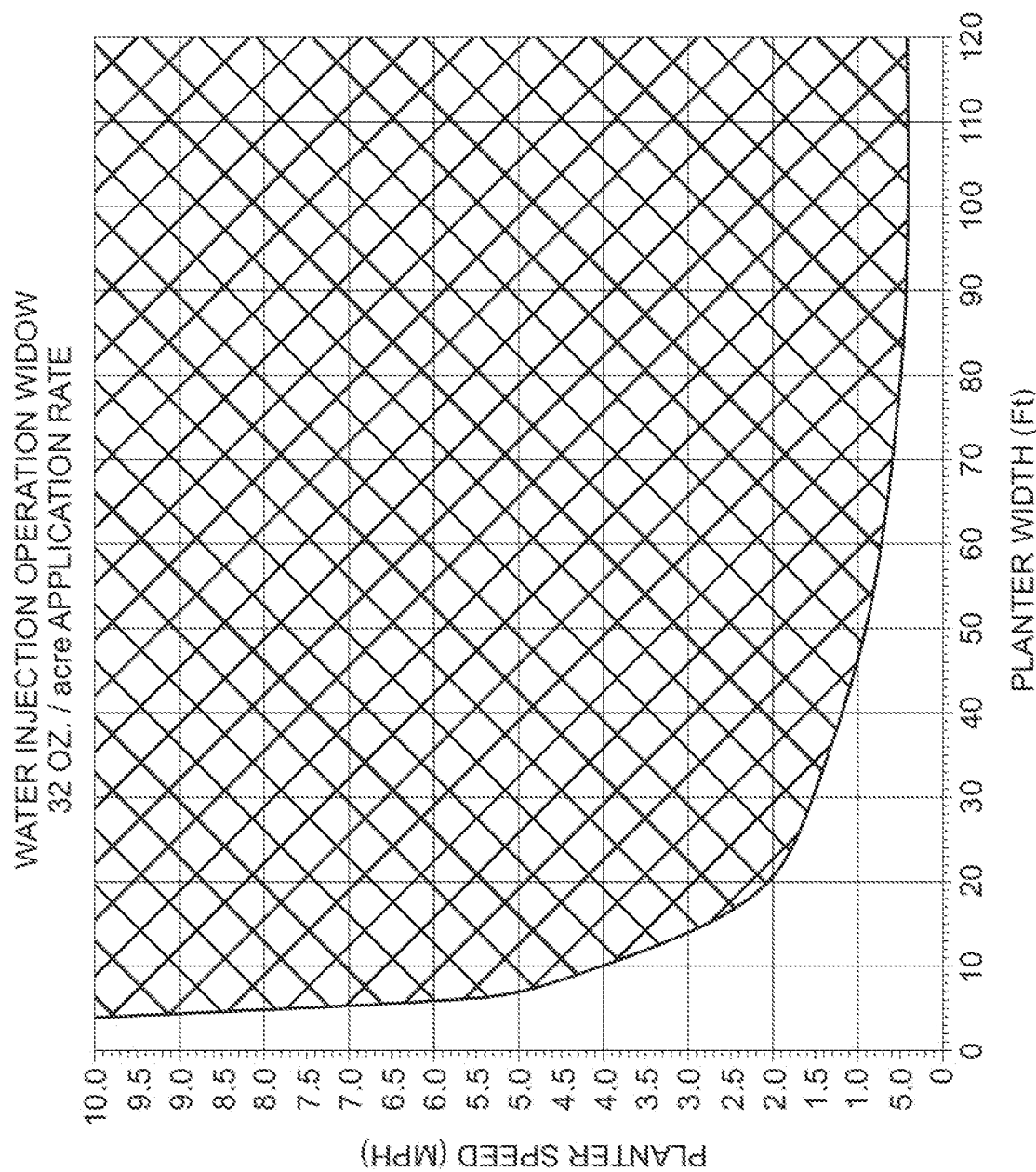

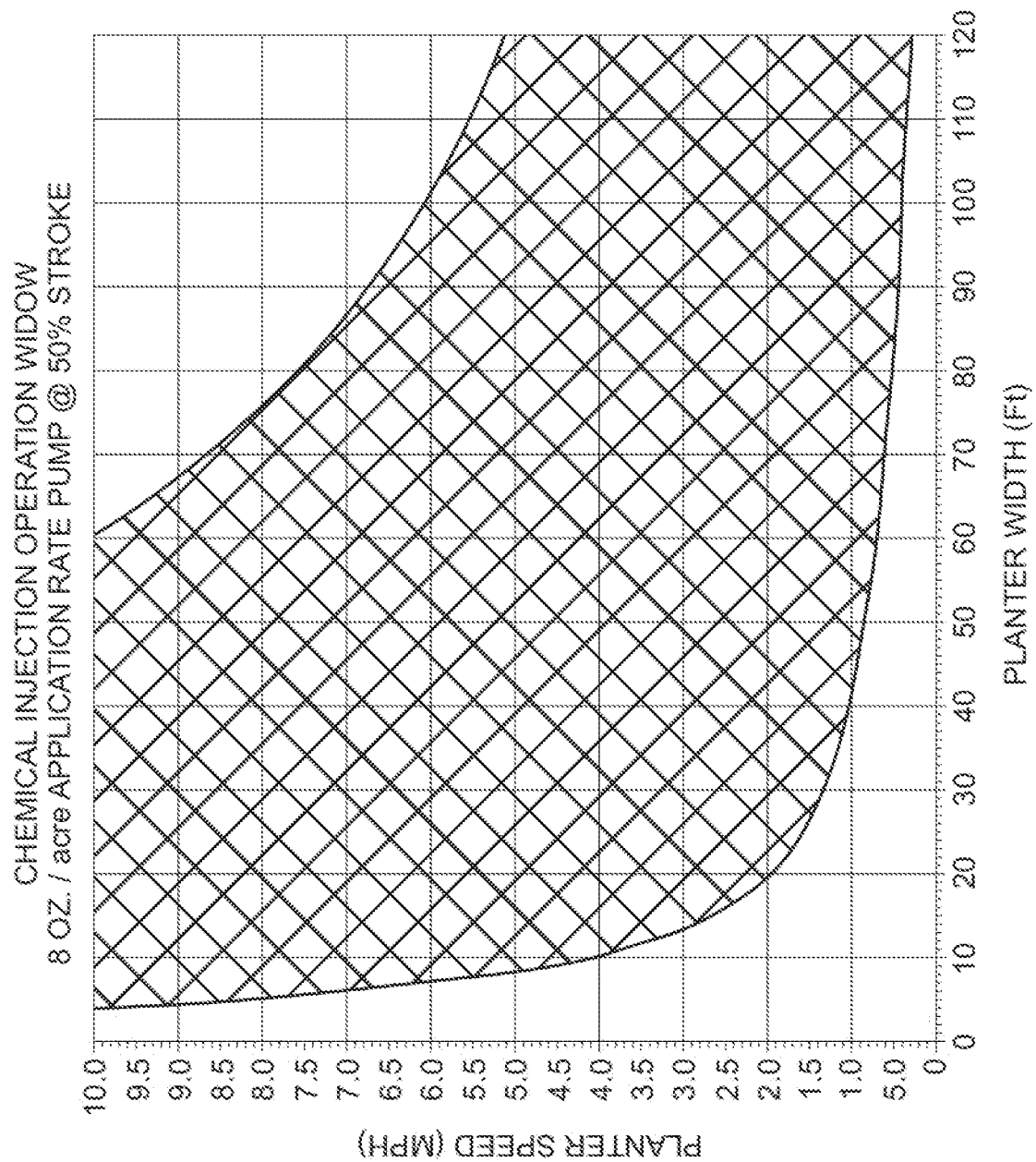

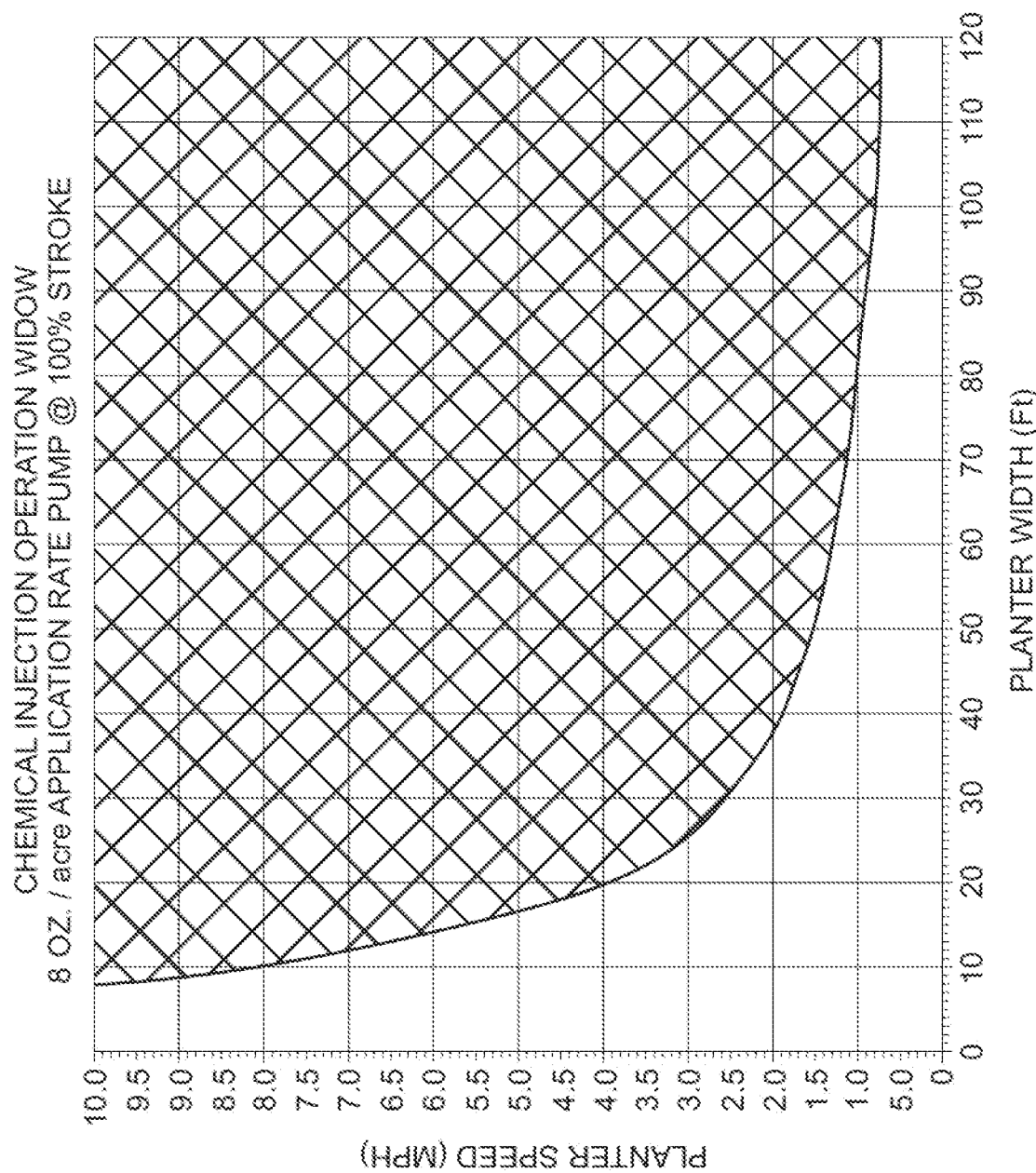

FOAM FORMULATIONS AND APPARATUS FOR DELIVERY

This application is a continuation of U.S. patent application Ser. No. 15/706,824, filed Sep. 18, 2017, which is a division of U.S. patent application Ser. No. 14/502,251, filed Sep. 30, 2014, which claims the benefit of U.S. Provisional Patent Application Nos. 61/884,369, filed Sep. 30, 2013; 61/891,729, filed Oct. 16, 2013; and 61/893,003, filed Oct. 18, 2013, each of which is incorporated herein by reference.

FIELD OF THE DISCLOSED SUBJECT MATTER

The present invention relates to the field of agrochemical compositions and formulations, as well as the apparatus and methods for applying such compositions and formulations.

BACKGROUND OF THE INVENTION

Many growers do not apply starter fertilizer, insecticide, or other beneficial agricultural treatments at the time of planting because the amount of additional transportation, handling, and labor required for such application.

Applying active ingredients to a large field requires the transport of large volumes of water. The water is commonly carried by a tractor, which has a limited capacity.

Additionally, in some regions water in large quantities is unavailable. Many agricultural actives are applied to crops or soil as sprays, which are vulnerable to spray drift and cannot be applied precisely. The active ingredient is typically added to a tank and mixed with a diluent such as water before being sprayed on the field or crop. The active ingredient may be in one of many known formulation types, for example, an emulsion concentrate (EC), a water-dispersible granule (WG), a microencapsulate (ME), or a suspension concentrate (SC). After dilution, using currently-known formulations and techniques, a typical application rate can be from approximately 3-25 gallons/acre. Application to 500 acres at a typical rate thus requires 1500-12500 gallons of liquid.

A tractor carrying a full load of seeds or other plant-generative material cannot accommodate such a high volume of liquid, so fertilizer, insecticide, or other treatment at time of planting requires multiple trips to refill the tractor's tanks. Rather than make these trips, most growers prefer to load seed once and plant uninterrupted all day long. Although this saves valuable planting time, it prevents a grower from applying fertilizer, insecticide, or other beneficial agricultural treatments at the time of planting. Application of treatment post-planting requires additional costs in terms of time, fuel and equipment. It would be beneficial if a grower could load both seed and fertilizer, insecticide, or other beneficial treatments once and plant uninterrupted while applying a planting-time treatment.

Thus the field of agriculture is in need of new techniques for formulating and applying agricultural active ingredients such as insecticides, herbicides, fungicides, pesticides, fertilizers, and plant nutrients. In particular, advances are needed that can reduce the volume of agricultural formulation needed to treat a particular area of field. This includes advances in increasing the efficacy of a given volume of an agricultural formulation, as well as advances that allow more precise delivery of an agricultural formulation to the area where it can be most effective. Such high-precision, ultra-low-volume application techniques allow greater areas to be covered while using lower amounts of active ingredient and lower volumes of water.

This results in greater resource efficiency, as well as time savings for the grower. Such techniques also reduce the amount of active ingredient applied to areas where such application may be either wasteful or actively harmful. These techniques also have environmental benefits: by reducing, the amount of agricultural active that is applied, they reduce the amount that is released into the environment. Precise application of agricultural actives also allows accurate positioning of a lethal dose, which helps to prevent resistant strains from developing.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

In one embodiment, the present disclosure describes a liquid agricultural formulation. The formulation contains an agriculturally active ingredient, at least one foaming agent, and at least one foam stabilizer. According to one aspect of this embodiment, the liquid agricultural formulation is capable of being applied in a furrow in the form of a foam. The agriculturally active ingredient can be a pesticide, for example an insecticide, a fungicide, an herbicide, a fertilizer, or a combination thereof. In a preferred aspect, the agriculturally active ingredient is the insecticide bifenthrin. In another aspect of this embodiment, the foaming agent can be sodium lauryl sulfate, odium dodecylbenzene sulfonate, or a combination thereof. In another aspect of this embodiment, the foam stabilizer can be glycerine, xanthan gum, or a combination thereof.

In another aspect of this embodiment, the liquid agricultural formulation also contains a dispersant and a preservative. The dispersant can be an alkyl polyglucoside.

In a preferred aspect of this embodiment, the foaming agent is sodium lauryl sulfate, the foam stabilizer is glycerine, and the formulation also contains sodium dodecylbenzene sulfonate and xanthan gum.

In another aspect of this embodiment, the liquid agricultural formulation can be foamed to create an agricultural foam. The resulting foam contains the liquid agricultural formulation of the previous embodiment, as well as a gas. In one aspect of this embodiment, the gas is air. In another aspect of this embodiment, the foam is capable of providing a crop-protective effect when administered to a seed in-furrow. In further aspects of this embodiment, the foam may have an expansion factor of 15, 25, 40, 50, 60, 70, 80, 90 or 100. In another aspect, the foam may have an expansion factor ranging between 40 and 60. In another aspect of this embodiment, the agriculturally active ingredient is present in the liquid agricultural formulation in the form of a microemulsion, an oil-in-water concentrated emulsion, a suspension, a suspension concentrate, an emulsifiable concentrate, or a microencapsulate. In a preferred aspect of this embodiment, the agriculturally active ingredient is in the form of a suspension concentrate. In a further aspect of this embodiment, the suspension concentrate is stable over a timescale of two years.

In another aspect of this embodiment, the liquid agricultural formulation contains bifenthrin and is insecticidally effective when administered at a rate of 1 gallon per acre or less.

In another embodiment, this disclosure describes a liquid agricultural formulation comprising bifenthrin, glycerine, an alkyl polyglucoside, a phosphate ester, and an alkyl sulfate. In further aspects of this embodiment, the liquid agricultural formulation contains bifenthrin at concentrations of at least 13%, 17%, 23%, or 40.

In still further aspects of this embodiment, the alkyl sulfate is sodium decyl sulfate, and is present at a concentration of at least 0.5% or 1.25%. In still further aspects of this embodiment, the phosphate ester is tridecyl alcohol ethoxylated phosphate ester, and is present at a concentration of at least 1%, 5%, 10%, or 20%.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 7 is a perspective view of the foam mixing chamber of FIG. 6.

FIG. 8 is a cross-sectional view through the foam mixing chamber of FIG. 6.

FIGS. 13-17 are graphical illustrations of exemplary speeds and planter widths that the present systems can operate within.

DETAILED DESCRIPTION OF EXEMPLARY EMBODIMENTS

Figure 1:
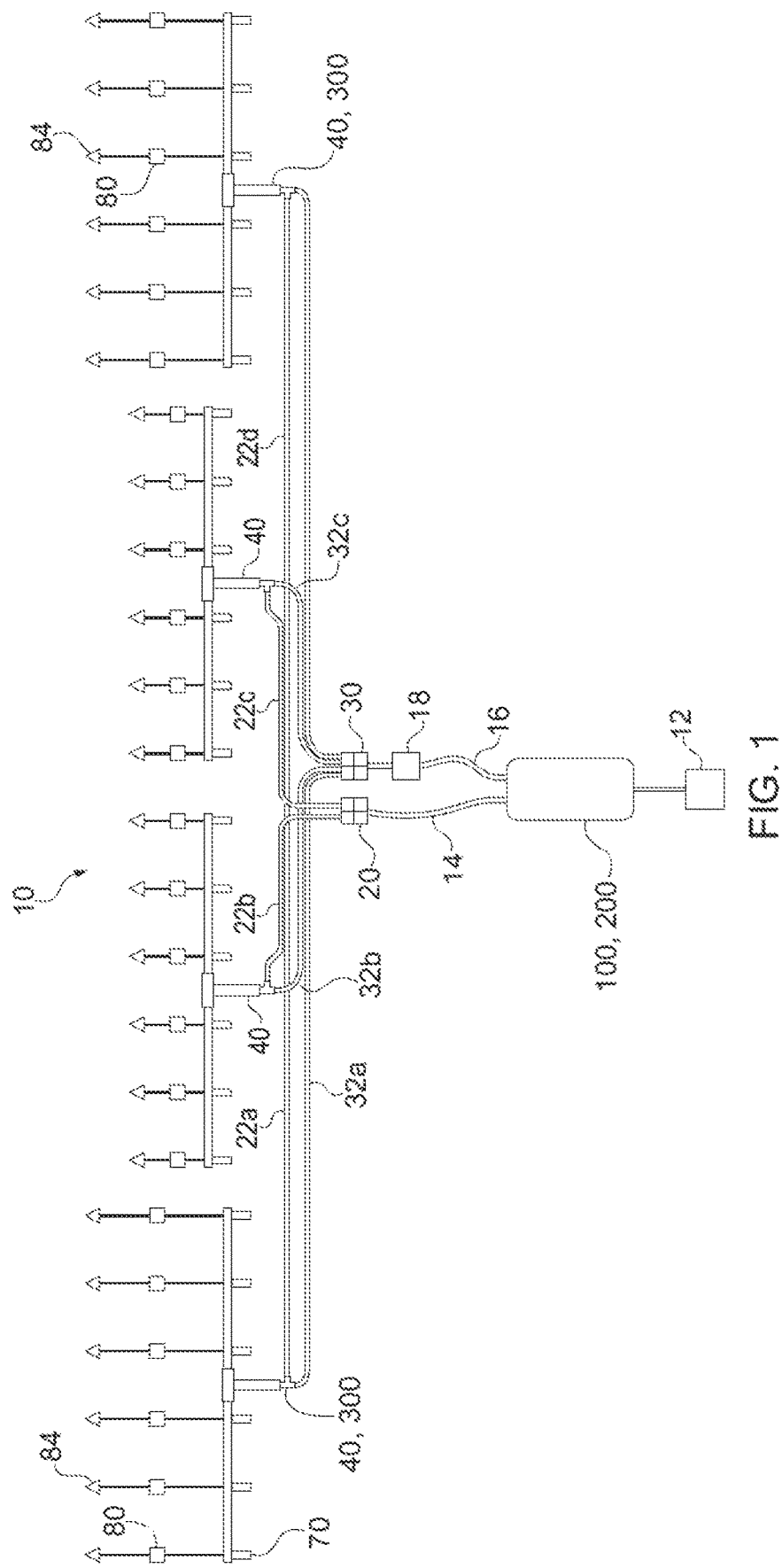
FIG. 1 is a schematic representation of an exemplary delivery system in accordance with an embodiment of the invention.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The present disclosure meets the needs for ultra-low-volume, high-precision application of agricultural active ingredients by providing a formulation capable of being foamed and applied in-furrow during planting. In at least one aspect of the present invention, the foamable formulations of the present disclosure can be applied at between 0.25-1.00 gallons/acre, much lower than the volumes at which conventional methods are effective. Broadcast spray of an agricultural ingredient, using typical concentrations and conventional spraying by ground-based equipment, typically requires between 10-40 gallons of liquid per acre. Agricultural actives mixed with fertilizer and applied as a liquid in-furrow typically require about 3-12 gallons of liquid per acre. T-Band application, in which a liquid containing the agricultural active is sprayed into the furrow from a nozzle positioned a few inches above the furrow, typically requires about 3 gallons/acre. Thus, the foamable formulations of the present disclosure substantially reduce the volume of liquid that is required to be carried by the tractor. In one embodiment, the foam has an expansion factor between 10-100, preferably 15-80. In another embodiment, the foam may have an expansion factor ranging between 40-60.

TABLE 1

Typical Liquid Volumes Needed for Various Delivery Methods (4.6 mph w/30" Rows)

| | Acre | | Distance | Rate | |
|---|---|---|---|---|---|
| Application | Gallons/ acre | mL/ acre | mL/ foot | mL/ second | mL/ minute |
| Broadcast Liquid | 25 [a] | 94625 | 5.43 | 36.66 | 2199 |
| Fertilizer Liquid | 9 [b] | 34065 | 1.96 | 13.20 | 792 |
| T-Band Liquid | 3 [c] | 11355 | 0.65 | 4.40 | 264 |
| Diluted Liquid Foam Formulation | 0.25 [d] | 946 | 0.05 | 0.37 | 22 |
| Expanded Foam formulation (25X) | 6.25 [e] | 23656 | 1.36 | 9.16 | 550 |
| Expanded Foam formulation (50X) | 12.50 [f] | 47303 | 2.43 | 16.38 | 983 |

[a, b, c, d]-volume of the formulations when diluted with water.
[e]-volume of foam when the diluted liquid foam formulation is airated and expanded × 25.
[f]-volume of foam when the diluted liquid foam formulation is airated and expanded × 50.

The foamable formulations of the present disclosure are stable, aqueous compositions suitable for generation of air foams in a dynamic system. Planting equipment is large, with a substantial distance from the foam generation chamber to the nozzle through which the foam is delivered to the furrow, in order to survive until delivery in-farrow, the foam must be stable as it flows through the conduit from the foam generation chamber to the nozzle. But the fluid dynamics of that flow can cause a foam to break down. As a result, foams that are stable when stationary are not necessarily stable when they flow through a conduit. Similarly, the characteristics of a foam generated in an ambient atmosphere can be substantially different than a foam generated within an enclosure, e.g. conduit.

Foams generated from the formulations of the present disclosure are stable when formed and delivered through the apparatus and corresponding methods as described below. Another factor in the development of the foamable formulations of the present disclosure is the important role of water quality and other environmental conditions in affecting the quality of the foam resulting from the present foamable formulations. Environmental conditions on a farm are uncontrolled. Weather can vary from cold, humid conditions to hot, dry conditions within a short period of time. Available water sources can vary in their pH and in their hardness. The foamable formulations of the present disclosure generate acceptable foams under a wide range of environmental conditions. For example, the foamable formulations disclosed herein, and the associated apparatus and methods for deploying these foamable formulations, do not require any heat treatments to be applied to the system (i.e. foam or apparatus) components. This advantageously reduces the design complexity, operating costs and power demands of the system. However, it would be apparent to one of ordinary skill that heating cooling capability can be readily incorporated into the present disclosure, if so desired. Moreover, the foamable formulations disclosed herein can be deposited or ejected from a nozzle which is placed in close proximity to the furrow. For purposes of illustration and not limitation, in an exemplary embodiment the nozzle can be located within a furrow at approximately 2-4 inches from the ground. The positioning of the nozzle in such proximity to the furrow is beneficial as it inhibits or eliminates undesired breakage of the foam and scattering of the foamable formulation due to wind gusts and the like.

As a result of this flow stability, the foam generated by the formulations of the present disclosure may be applied through a nozzle directly in-furrow to seeds as they are being planted. This direct, precise application of the active ingredient to where it is most needed further reduces the amount of active ingredient that must be applied, further reducing the weight carried on the tractor.

The foamable formulations of the present disclosure include at least one active ingredient, at least one foaming agent, and at least one foam stabilizer. It is recognized that the foamable formulations may include more than one active ingredient, foaming agent and/or foam stabilizer. They may be prepared and used without dilution, or they may be diluted with water before use. The formulation may be diluted by mixing with water in the storage tank on the tractor ("tank mixing"), in these embodiments the formulation can be configured such that the mixture will remain stable upon mixing (i.e. introducing water to the formulation).

Alternatively, the formulation can be configured such that the mixture will require agitation prior to foaming, wherein the agitation can be provided by a mechanical mixture member (not shown) located within the tank. Additionally or alternatively, the mixing motion can be provided by the vibration and oscillation induced by normal operation of the tractor over the terrain. In other embodiments, mixing the formulation with water can occur inline while it is being pumped to the foaming chamber. In an exemplary embodiment, the mixing can occur at a location upstream of the discharge or ejection nozzle(s).

Additionally, a valve(s) (e.g. a solenoid valve) can be positioned at a location between the mixture point (i.e., where water is introduced to the formulation) and the discharge nozzle which can serve to open and close the conduit on demand. This can be advantageous as it allows for intermittent stoppage of the foam discharge (e.g. during periods when the tractor is beyond the planting/foaming area) without interfering with or reducing the time required for sufficient interaction between the formulation and the water. In other words, the valve(s) can be located at a point downstream from the mixture point (i.e. where water is introduced to the formulation) such that the water has enough time (and length within the conduit) to interact with the formulation to generate the desired foam consistency and characteristics.

The valve(s) can then open and close as desired to allow foam to dispense from the nozzles. When the valve(s) is closed, the tractor can reposition as needed without wasting any of the foam. The foam is retained in a "standby" mode within the conduit and is ready for discharge as soon as the valve is re-opened. Accordingly, the system disclosed herein minimizes waste due to unwanted discharge of foam (e.g. when a tractor is repositioning), as well as the dwell time required to prepare the foam for discharge (since the foam can be retained close to the nozzle location rather than in a tank disposed upstream).

The active ingredient of the foamable formulation is an agriculturally appropriate active ingredient that can be formulated in a suspension concentrate or other appropriate formulation type, including herbicides, insecticides, fungicides, and fertilizers or combinations thereof. The final concentration of the active ingredient in the foamable formulation can range from 0.1-6.00 lbs a.i./gallon. 0.75-4.00 lbs a.i./gallon, and preferably from 0.75-2.00 lbs a.i./gallon.

Suitable active ingredients for the foamable formulations of the present disclosure include the following:

Insecticides: A1) the class of carbamates consisting of aldicarb, alanycarb, benfuracarb, carbaryl, carbofuran, carbosulfan, methiocarb, methomyl, oxamyl, pirimicarb, propoxur and thiodicarb; A2) the class of organophosphates consisting of acephate, azinphos-ethyl, azinphos-methyl, chlorfenvinphos, chlorpyrifos, chlorpyrifos-methyl, demeton-S-methyl, diazinon, dichlorvos/DDVP, dicrotophos, dimethoate, disulfoton, ethion, fenitrothion, fenthion, isoxathion, malathion, methamidaphos, methidathion, mevinphos, monocrotophos, oxymethoate, oxydemeton-methyl, parathion, parathion-methyl, phenthoate, phorate, phosalone, phosmet, phosphamidon, pirimiphos-methyl, quinalphos, terbufos, tetrachlorvinphos, triazophos and trichlorfon; A3) the class of cyclodiene organochlorine compounds such as endosulfan; A4) the class of fiproles consisting of ethiprole, fipronil, pyrafluprole and pyriprole; A5) the class of neonicotinoids consisting of acetamiprid, chlothianidin, dinotefuran, imidacloprid, nitenpyrathiacloprid and thiamethoxam; A6) the class of spinosyns such as spinosad and spinetoram; A7) chloride channel activators from the class of mectins consisting of abamectin, emamectin benzoate, ivermectin, lepimectin and milbentectin; A8) juvenile hormone mimics such as hydroprene, kinoprene, methoprene, fenoxycarb and pyriproxyfen; A9) selective homopteran feeding blockers such as pymetrozine, flonicamid and pyrifluquinazon; A10) mite growth inhibitors such as clofentezine, hexythiazox and etoxazole; A11) inhibitors of mitochondrial ATP synthase such as diafenthiuron, fenbutatin oxide and propargite; uncouplers of oxidative phosphorylation such as chlorfenapyr; A12) nicotinic acetylcholine receptor channel blockers such as bensultap, cartap hydrochloride, thiocyclam and thiosultap sodium; A13) inhibitors of the chitin biosynthesis type 0 from the benzoylurea class consisting of bistrifluron, diflubenzuron, flufenoxuron, hexaflumuron, lufenuron, novaluron and teflubenzuron; A14) inhibitors of the chitin biosynthesis type 1 such as buprofezin; A15) moulting disruptors such as cyromazine; A16) ecdyson receptor agonists such as methoxyfenozide, tebufenozide, halofenozide and chromafenozide; A17) octopamin receptor agonists such as amitraz; A18) mitochondrial complex electron transport inhibitors pyridaben, tebufenpyrad, tolfenpyrad, flufenerim, cyenopyrafen, cyflumetofen, hydramethylnon, acequinocyl or fluacrypyrim; A19) voltage-dependent sodium channel blockers such as indoxacarb and metaflumizone; A20) inhibitors of the lipid synthesis such as spirodiclofen, spiromesifen and spirotetramat; A21) ryanodine receptor-modulators from the class of diamides consisting of flubendiamide, the phthalamide compounds (R)-3-Chlor-N1-{2-methyl-4-[1,2,2,2-tetrafluor-1-(trifluormethyl)ethyl)phenyl}-N2-(1-methyl-2-methylsulfonylethyl)phthalamid and (S)-3-Chlor-N1-{2-methyl-441,2,2,2-tetrafluor-1-(trifluormethyl)ethyl]phenyl}-N2-(1-methyl-2-methylsulfonylethyl)phthalamid, chloranthraniliprole and cy-anthraniliprole; A22) compounds of unknown or uncertain mode of action such as azadirachtin, amidoflumet, bifenazate, fluensulfone, piperonyl butoxide, pyridalyl, sulfoxaflor; or A23) sodium channel modulators from the class of pyrethroids consisting of acrinathrin, allethrin, bifenthrin, cyfluthrin, lambda-cyhalothrin, cyper-methrin, alpha-cypermethrin, beta-cypermethrin, zeta-cypermethrin, deltamethrin, esfenvalerate, etofenprox, fenpropathrin, fenvalerate, flucythrinate, tau-fluvalinate, permethrin, silafluofen, tefluthrin and tralomethrin and any suitable combinations thereof.

Fungicides: B1) azoles selected from the group consisting of bitertanol, bromuconazole, cyproconazole, difenoconazole, diniconazole, enilconazole, epoxiconazole, fluquinconazole, fenbuconazole, flusilazole, flutriafol, hexaconazole, imibenconazole, ipconazole, metconazole, myclobutanil, penconazole, propiconazole, prothioconazole, simeconazole, triadimefon, triadimenol, tebuconazole, tetraconazole, triticonazole, prochloraz, pefurazoate, imazalil, triflumizole, cyazofamid, benomyl, carbendazim, thia-bendazole, fuberidazole, ethaboxam, etridiazole and hymexazole, azaconazole, diniconazole-M, oxpoconazol, paclobutrazol, uniconazol, 1-(4-chloro-phenyl)-2-([1,2,4]triazol-1-yl)-cycloheptanol and imazalilsulfphate; B2) strobilurins selected from the group consisting of azoxystrobin, dimoxystrobin, enestroburin, fluoxastrobin, kresoximmethyl, methominostrobin, orysastrobin, picoxystrobin, pyraclostrobin, trifloxystrobin, enestroburin, methyl (2-chloro-541-(3-methylbenzyloxyimino)ethyl]benzyl)carbamate, methyl (2-chloro-5-[1-(6-methylpyridin-2-yl methoxyimino)ethyl]benzyl)carbamate and methyl 2-(ortho-(2,5-dimethylphenyloxymethylene)-phenyl)-3-methoxyacrylate, 2(2-(6-(3-chloro-2-methyl-phenoxy)-5-fluoro-pyrimidin-4-yloxy)-phenyl)-2-methoxyimino-N-methyl-acetamide and 3-methoxy-2-(2-(N-(4-methoxyphenyl)-cyclopropanecarboximidoylsulfanylmethyl)-phenyl)-acrylic acid methyl ester; B3) carboxamides selected from the group consisting of carboxin, benalaxyl, benalaxyl-M, fenhexamid, flutolanil, furametpyr, mepronil, metalaxyl, mefenoxam, ofurace, oxadixyl, oxycarboxin, penthiopyrad, isopyrazam, thifluzamide, tiadinil, 3,4-dichloro-N-(2-cyanophenyl)isothiazole-5-carboxamide, dimethomorph, flumorph, flumetover, fluopicolide (picobenzamid), zoxamide, carpropamid, diclocymet, mandipropamid, N-2-(443-(4-chlorophenyl)prop-2-ynyloxy]-3-methoxyphenyl)ethyl)-2-methanesulfonyl-amino-3-methylbutyramide, N-(2-(4[3-(4-chloro-phenyl)prop-2-ynyloxy]-3-methoxy-phenyl)ethyl)-2-ethanesulfonylamino-3-methylbutyramide, methyl 3-(4-chlorophenyl)-3-(2-isopropoxycarbonyl-amino-3-methyl-butyrylamino) propionate, N-(4'-bromobiphenyl-2-yl)-4-difluoromethyl A-methylthiazole-6-carboxamide, N-(4'-trifluoromethyl-biphenyl-2-yl)-4-difluoromethyl-2-methylthiazole-5-carboxamide, N-(4'-chloro-3'-fluorobiphenyl-2-yl)-4-difluoromethyl-2-methyl-thiazole-5-carboxamide, N-(3\4'-dichloro-4-fluorobiphenyl-2-yl)-3-difluoro-methyl-1-methyl-pyrazole-4-carboxamide, N-(3',4'-dichloro-5-fluorobiphenyl-2-yl)-3-difluoromethyl-1-methylpyrazole-4-carboxamide, N-(2-cyano-phenyl)-3,4-dichloroisothiazole-5-carboxamide, 2-amino-4-methyl-thiazole-5-carboxanilide, 2-chloro-N-(1,1,3-trimethyl-indan-4-yl)-nicotinamide, N-(2-(1,3-dimethylbutyl)-phenyl)-1,3-dimethyl-5-fluoro-1H-pyrazole-4-carboxamide, N-(4'-chloro-3',5-difluoro-biphenyl-2-yl)-3-difluoromethyl-1-methyl-1H-pyrazole-4-carboxamide, N-(4'-chloro-3',5-difluoro-biphenyl-2-yl)-3-trifluoromethyl-1-methyl-1H-pyrazole-4-carboxamide, N-(3',4'-dichloro-5-fluoro-biphenyl-2-yl)-3-trifluoromethyl-1-methyl-1H-pyrazole-4-carboxamide, N-(3',5-difluoro-4'-methyl-biphenyl-2-yl)-3-difluoromethyl-1-methyl-1H-pyrazole-4-carboxamide, N-(3',5-difluoro-4'-methyl-biphenyl-2-yl)-3-trifluoromethyl-1-methyl-1H-pyrazole-4-carboxamide, N-(cis-2-bicyclopropyl-2-yl-phenyl)-3-difluoromethyl-1-methyl-1H-pyrazole-4-carboxamide, N-(trans-2-bicyclopropyl-2-yl-phenyl)-3-difluoro-methyl-1-methyl-1H-pyrazole-4-carboxamide, fluopyram, N-(3-ethyl-3,5-5-trimethyl-cyclohexyl)-3-formylamino-2-hydroxy-benzamide, oxytetracyclin, silthiofam, N-(6-methoxy-pyridin-3-yl) cyclopropanecarboxamide, 2-iodo-N-phenyl-benzamide, N-(2-bicyclo-propyl-2-yl-phenyl)3-difluormethyl-1-methylpyrazol-4-ylcarboxamide, N-(3',4',5'-trifluorobiphenyl-2-yl)-1,3-dimethylpyrazol-4-ylcarboxamide, N-(3',4',5'-trifluorobiphenyl-2-yl)-1,3-dimethyl-5-fluoropyrazol-4-yl-carboxamide, N-(3',4',5'-trifluorobiphenyl-2-yl)-5-chloro-1,3-dimethyl-pyrazol-4-ylcarboxamide, N-(3',4',5'-trifluorobiphenyl-2-yl)-3-fluoromethyl-1-methylpyrazol-4-ylcarboxamide, N-(3',4',5'-trifluorobiphenyl-2-yl)-3-(chlorofluoromethyl)-1-methylpyrazol-4-ylcarboxamide, N-(3',4',5'-trifluorobiphenyl-2-yl)-3-difluoromethyl-1-methylpyrazol-4-ylcarboxamide, N-(3',4',5'-trifluorobiphenyl-2-yl)-3-difluoromethyl-5-fluoro-1-methylpyrazol-4-yl-carboxamide, N-(3',4',5'-trifluorobiphenyl-2-yl)-5-chloro-3-difluoromethyl-1-methylpyrazol-4-ylcarboxamide, N-(3',4',5'-trifluorobiphenyl-2-yl)-3-(chlorodifluoromethyl)-1-methylpyrazol-4-ylcarboxamide, N-(3',4',5'-trifluorobiphenyl-2-yl)-1-methyl-3-trifluoromethylpyrazol-4-ylcarboxamide, N-(3',4',5'-trifluorobiphenyl-2-yl)-5-fluoro-1-methyl-3-trifluoromethylpyrazol-4-ylcarboxamide, N-(3',4',5'-trifluorobiphenyl-2-yl)-5-chloro-1-methyl-3-trifluoromethylpyrazol-4-ylcarboxamide, N-(2',4',5'-trifluorobiphenyl-2-yl)-1,3-dimethylpyrazol-4-ylcarboxamide, N-(2',4',5'-trifluorobiphenyl-2-yl)-1,3-dimethyl-5-fluoropyrazol-4-ylcarboxamide, N-(2',4',5'-trifluorobiphenyl-2-yl)-5-chloro-1,3-dimethylpyrazol-4-ylcarboxamide, N-(2',4',5'-trifluorobiphenyl-2-yl)-3-fluoromethyl-1-methylpyrazol-4-ylcarboxamide, N-(2',4',5'-trifluorobiphenyl-2-yl)-3-(chlorofluoromethyl)-1-methylpyrazol-4-ylcarboxamide, N-(2',4',5'-trifluorobiphenyl-2-yl)-3-difluoromethyl-1-methylpyrazol-4-ylcarboxamide, N-(2',4',5'-trifluorobiphenyl-2-yl)-3-difluoromethyl-5-fluoro-1-methylpyrazol-4-yl-carboxamide, N-(2',4',5'-trifluorobiphenyl-2-yl)-5-chloro-3-difluoromethyl-1-methylpyrazol-4-ylcarboxamide, N-(2',4',5'-trifluorobiphenyl-2-yl)-3-(chlorodifluoromethyl)-1-methylpyrazol-4-ylcarboxamide, N-(2',4',5'-trifluorobiphenyl-2-yl)-1-methyl-3-trifluoromethylpyrazol-4-ylcarboxamide, N-(2',4',5'-trifluorobiphenyl-2-yl)-5-fluoro-1-methyl-3-trifluoromethylpyrazol-4-ylcarboxamide, N-(2',4',5'-trifluorobiphenyl-2-yl)-5-chloro-1-methyl-3-trifluoromethylpyrazol-4-ylcarboxamide, N-(3',4'-dichloro-3-fluorobiphenyl-2-yl)-1-methyl-3-trifluoromethyl-1H-pyrazole-4-carboxamide, N-(3',4'-dichloro-3-fluorobiphenyl-2-yl)-1-methyl-3-difluoromethyl-1H-pyrazole-4-carboxamide, N-(3',4'-difluoro-3-fluorobiphenyl-2-yl)-1-methyl-3-trifluoromethyl-1H-pyrazole-4-carboxamide, N-(3',4'-difluoro-3-fluorobiphenyl-2-yl)-1-methyl-S-difluoromethyl-1H-pyrazole-4-carboxamide, N-(3'-chloro-4'-fluoro-3-fluorobiphenyl-2-yl)-1-methyl-3-difluoromethyl-1H-pyrazole-4-carboxamide, N-(3',4'-dichloro-4-fluorobiphenyl-2-yl)-1-methyl-3-trifluoromethyl-1H-pyrazole-4-carboxamide, N-(3',4'-difluoro-4-fluorobiphenyl-2-yl-1-methyl-S-trifluoromethyl-1H-pyrazole-4-carboxamide, N-(3',4'-dichloro-4-fluorobiphenyl-2-yl)-1-methyl-3-difluoromethyl-1H-pyrazole-4-carboxamide, N-(3',4'-difluoro-4-fluorobiphenyl-2-yl)-1-methyl-3-difluoromethyl-1H-pyrazole-4-carboxamide, N-(3'-chloro-4'-fluoro-4-fluorobiphenyl-2-yl)-1-methyl-S-difluoromethyl-1H-pyrazole-4-carboxamide, N-(3',4'-dichloro-5-fluorobiphenyl-2-yl)-1-methyl-3-trifluoromethyl-1H-pyrazole-4-carboxamide, N-(3',4'-difluoro-5-fluorobiphenyl-2-yl)-1-methyl-3-trifluoromethyl-1H-pyrazole-4-carboxamide, N-(3',4'-dichloro-5-fluorobiphenyl-2-yl)-1-methyl-S-difluoromethyl-1H-pyrazole-carboxamide, N-(3',4'-difluoro-5-fluorobiphenyl-2-yl)-1-methyl-3-difluoromethyl-1H-pyrazole-4-carboxamide, N-(3',4'-dichloro-5-fluorobiphenyl-2-yl)-1,3-dimethyl-1H-pyrazole-4-carboxamide, N-(3'-chloro-4'-fluoro-5-fluorobiphenyl-2-yl)-1-methyl-3-difluoromethyl-1H-pyrazole-4-carboxamide, N-(4'-fluoro-4-fluorobiphenyl-2-yl)-1-methyl-3-trifluoromethyl-1H-pyrazole-4-carboxamide, N-(4'-fluoro-5-fluorobiphenyl-2-yl)-1-methyl-3-trifluoromethyl-1H-pyrazole-4-carboxamide, N-(4'-chloro-5-fluorobiphenyl-2-yl)1-methyl-3-trifluoromethyl-1H-pyrazole-4-carboxamide, N-(4'-methyl-5-fluorobiphenyl-2-yl)-1-methyl-3-trifluoromethyl-1H-pyrazole-4-carboxamide, N-(4'-fluoro-5-fluorobiphenyl-2-yl)-1,3-dimethyl-1H-pyrazole-4-carboxamide, N-(4'-chloro-5-fluorobiphenyl-2-yl)-1,3-dimethyl-1H-pyrazole-4-carboxamide, N-(4'-methyl-5-fluorobiphenyl-2-yl)-1,3-dimethyl-1H-pyrazole-4-carboxamide, N-(4'-fluoro-6-fluorobiphenyl-2-yl)-1-methyl-3-trifluoromethyl-1H-pyrazole-4-carboxamide, N-(4'-chloro-6-fluorobiphenyl-2-yl)-1-methyl-3-trifluoromethyl-1H-pyrazole-4-carboxamide, N-[2-(1,1,2,3,3,3-hexafluoropropoxy)-phenyl]-3-difluoromethyl-1-methyl-1H-pyrazole-4-carboxamide, N-[4'-(trifluoromethylthio)-biphenyl-2-yl]-3-difluoromethyl-1-methyl-1H-pyrazole-4-carboxamide and N44'-(trifluoromethylthio)-biphenyl-2-yl]-1-methyl-3-trifluoromethyl-1H-pyrazole-4-carboxamide; B4) heterocyclic compounds selected from the group consisting of fluazinam, pyrifenox, bupirimate, cyprodinil, fenarimol, ferimzone, mepanipyrim, nuarimol, pyrimethanil, triforine, fenpiclonil, fludioxonil, aldimorph, dodemorph, fenpropimorph, tridemorph, fenpropidin, iprodione, procymidone, vinclozolin, famoxadone, fenamidone, octhilinone, proben-azole, 5-chloro-7-(4-methyl-piperidin-1-yl)-6-(2,4,6-trifluorophenyl)41,2,4]triazolo[1,5-a]pyrimidine, anilazine, diclomezine, pyroquilon, proquinazid, tricyclazole, 2-butoxy-6-iodo-3-propyl-chromen-4-one, acibenzolar-S-methyl, captafol, captan, dazomet, folpet, fenoxanil, quinoxyfen, N,N-dimethyl-3-(3-bromo-6-fluoro-2-methylindole-1-sulfonyl)-[1,2,4]triazole-1-sulfonamide, 5-ethyl-6-octyl41,2,4]triazolo[1,5-a]pyrimidin-2,7-diamine, 2,3,5,6-tetrachloro-4-methanesulfonyl-pyridine, 3,4,5-trichloro-pyridine-2,6-di-carbonitrile, N-(1-(5-bromo-3-chloro-pyridin-2-yl)-ethyl)-2,4-dichloro-nicotinamide, N-((5-bromo-3-chloro pyridin-2-yl)-methyl)-2,4-dichloro-nicotinamide, diflumetorim, nitrapyrin, dodemorphacetate, fluoroimid, blasticidin-S, chinomethionat, debacarb, difenzoquat, difenzoquat-methylsulphat, oxolinic acid and piperalin; B5) carbamates selected from the group consisting of mancozeb, maneb, metam, methasulphocarb, metiram, ferbam, propineb, thiram, zineb, ziram, diethofencarb, iprovalicarb, benthiavalicarb, propamocarb, propamocarb hydrochlorid, 4-fluorophenyl N-(1-(1-(4-cyanophenyl)-ethanesulfonyl)but-2-yl)carbamate, methyl 3-(4-chloro-phenyl)-3-(2-isopropoxycarbonylamino-3-methyl-butyrylamino)propanoate; or B6) other fungicides selected from the group consisting of guanidine, dodine, dodine free base, iminoctadine, guazatine, antibiotics: kasugamycin, streptomycin, polyoxin, validamycin A, nitrophenyl derivatives, binapacryl, dinocap, dinobuton, sulfur-containing heterocyclyl compounds: dithianon, isoprothiolane, organometallic compounds: fentin salts, organophosphorus compounds: edifenphos, iprobenfos, fosetyl, fosetyl-aluminum, phosphorous acid and its salts, pyrazophos, tolclofos-methyl, organochlorine compounds: dichlofluanid, flusulfamide, hexachloro-benzene, phthalide, pencycuron, quintozene, thiophanate-methyl, tolylfluanid, others: cyflufenamid, cymoxanil, dimethirimol, ethirimol, furalaxyl, metrafenone and spiroxamine, guazatine-acetate, iminoc-tadine-triacetate, iminoctadine-tris(albesilate), kasugamycin hydrochloride hydrate, dichlorophen, pentachlorophenol and its salts, N-(4-chloro-2-nitro-phenyl)-N-ethyl-4-methyl-benzenesulfonamide, dicloran, nitrothal-isopropyl, tecnazen, biphenyl, bronopol, diphenylamine, mildiomycin, oxincopper, prohexadione calcium, N-(cyclopropylmethoxyimino-(6-difluoromethoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluormethyl-4-(3-trimethyl-silanyl-propoxy)-phenyl)-N-ethyl-N-methylformamidine and N'-(5-difluormethyl-2-methyl-4-(3-trimethylsilanyl-propoxy)-phenyl)-N-ethyl-N-methyl formamidine, and any combinations thereof.

Herbicides: C1) acetyl-CoA carboxylase inhibitors (ACC), for example cyclohexenone oxime ethers, such as alloxydim, clethodim, cloproxydim, cycloxydim, sethoxydim, tralkoxydim, butroxydim, clefoxydim or tepraloxydim; phenoxyphenoxypropionic esters, such as clodinafop-propargyl, cyhalofop-butyl, diclofop-methyl, fenoxaprop-ethyl, fenoxaprop-P-ethyl, fenthiapropethyl, fluazifop-butyl, fluazifop-P-butyl, haloxyfop-ethoxyethyl, haloxyfop-methyl, haloxyfop-P-methyl, isoxapyrifop, propaquizafop, quizalofop-ethyl, quizalofop-P-ethyl or quizalofop-tefuryl; or arylaminopropionic acids, such as flamprop-methyl or flamprop-isopropyl; C2 acetolactate synthase inhibitors (ALS), for example imidazolinones, such as imazapyr, imazaquin, imazamethabenz-methyl (imazame), imazamox, imazapic or imazethapyr; pyrimidyl ethers, such as pyrithiobac-acid, pyrithiobac-sodium, bispyribac-sodium, KIH-6127 or pyribenzoxym; sulfonamides, such as florasulam, flumetsulam or metosulam; or sulfonylureas, such as amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, halosulfuron-methyl, imazosulfuron, metsulfuron-methyl, nicosulfuron, primisulfuron-methyl, prosulfuron, pyrazosulfuron-ethyl, rimsulfuron, sulfometuron-methyl, thifensulfuron-methyl, triasulfuron, tribenuron-methyl, triflusulfuron-methyl, tritosulfuron, sulfosulfuron, foramsulfuron or iodosulfuron; C3) amides, for example allidochlor (CDAA), benzoylprop-ethyl, bromobutide, chlorthiamid, diphenamid, etobenzanidibenzchlomet), fluthiamide, fosamin or monalide; C4) auxin herbicides, for example pyridinecarboxylic acids, such as clopyralid or picloram; or 2,4-D or benazolin; C5) auxin transport inhibitors, for example naptalame or diflufenzopyr; C6) carotenoid biosynthesis inhibitors, for example benzofenap, clomazone (dimethazone), diflufenican, fluorochloridone, fluridone, pyrazolynate, pyrazoxyfen, isoxaflutole, isoxachlortole, mesotrione, sulcotrione (chlormesulone), ketospiradox, flurtamone norflurazon or amitrol; C7) enolpyruvylshikimate-3-phosphate synthase inhibitors (EPSPS), for example glyphosate or sulfosate; C8) glutamine synthetase inhibitors, for example bilanafos (bialaphos) or glufosinate-ammonium; C9) lipid biosynthesis inhibitors, for example anilides, such as anilofos or mefenacet; chloroacetanilides, such as dimethenamid, S-dimethenamid, acetochlor, alachlor, butachlor, butenachlor, diethatyl-ethyl, dimethachlor, metazachlor, metolachlor, S-metolachlor, pretilachlor, propachlor, prynachlor, terbuchlor, thenylchlor or xylachlor; thioureas, such as butylate, cycloate, di-allate, dimepiperate, EPTC esprocarb, molinate, pebulate, prosulfocarb, thiobencarb (benthiocarb), tri-allate or vemolate; or benfuresate or perfluidone; C10) mitosis inhibitors, for example carbamates, such as asulam, carbetamid, chlorpropham, orbencarb, pronamid (propyzamid), propham or tiocarbazil; dinitroanilines, such as benefin, butralin, dinitramin, ethalfluralin, fluchloralin oryzalin, pendimethalin, prodiamine or trifluralin; pyridines, such as dithiopyr or thiazopyr; or butamifos, chlorthal-dimethyl (DCPA) or maleic hydrazide; C11) protoporphyrinogen IX oxidase inhibitors, for example diphenyl ethers, such as acifluorfen, acifluorfen-sodium, aclonifen, bifenox, chlomitrofen (CNP), ethoxyfen, fluorodifen, fluoroglycofenethyl, fomesafen, furyloxyfen, lactofen, nitrofen, nitrofluorfen or oxyfluorfen; oxadiazoles, such as oxadiargyl or oxadiazon, cyclic imides, such as azafenidin, butafenacil, carfentrazone-ethyl, cinidon-ethyl, flumiclorac-pentyl, flumioxazin, flumipropyn, flupropacil, fluthiacet-methyl, sulfentrazone or thidiazimin; or pyrazoles, such as ET-751.JV 485 or nipyraclofen; C12) photosynthesis inhibitors, for example propanil, pyridate or pyridafol, benzothiadiazinones, such as bentazone; dinitrophenols, for example bromofenoxim dinoseb, dinoseb-acetate, dinoterb or DNOC; dipyridylenes, such as cyperquat-chloride, difenzoquat-methylsulfate, diquat or paraquat-dichloride; ureas, such as chlorbromuron, chlorotoluron, difenoxuron, dimefuron, diuron, ethidimuron, fenuron, fluometuron, isoproturonisouron, linuron, methabenzthiazuron, methazole, metobenzuron, metoxuron, monolinuron, neburon, siduron or tebuthiuron; phenols, such as bromoxynil or ioxynil; chloridazon; triazines, such as ametryn, atrazine, cyanazine, desmein, dimethamethryn, hexazinone, prometon, prometryn, propazine, simazine, simetryn, terbumenton, terbutryn terbutylazine or trietazine; triazinones, such as metamitron or metribuzin; uracils, such as bromacil, lenacil or terbacil; or biscarbamates, such as desmedipham or phenmedipham; C13) synergists, for example oxiranes, such as tridiphane; C14) CIS cell wall synthesis inhibitors, for example isoxaben or dichlobenil; C16) various other herbicides, for example dichloropropionic acids, such as dalapon; dihydrobenzofurans, such as ethofumesate; phenylacetic acids, such as chlorfenac (fenac); or aziprotryn, barban, bensulide, benzthiazuron, benzofluor, buminafos, buthidazole, buturon, catenstrole, chlorbufam, chlorfenpropmethyl, chloroxuron, cinmethylin, cumyluron, cycluron, cyprazine, cyprazole, dibenzyluron, dipropetryn, dymron, eglinazin-ethyl, endothall, ethiozin, flucabazone, fluorbentranil, flupoxam, isocarbamid, isopropalin, karbutilate, mefluidide, monuron, napropamide, napropanilide, nitralin, oxaciclomefone, phenisopham, piperophos, procyazine, profluralin, pyributicarb, secbumeton, sulfallate (CDEC), terbucarb, triaziflam, triazofenamid or trimeturon; or their environmentally compatible salts or combinations thereof.

Nematicides: Benomyl, cloethocarb, aldoxycarb, tirpate, diamidafos, fenamiphos, cadusafos, dichlofenthion, ethoprophos, fensulfothion, fosthiazate, heterophos, isamidofof, isazofos, phosphocarb, thionazin, imicyafos, mecarphon, acetoprole, benclothiaz, chloropicrin, dazomet, fluensulfone and suitable combinations thereof.

Plant Growth Regulators: D1) Antiauxins, such as clofibric acid, 2,3,5-tri-iodobenzoic acid; D2) Auxins such as 4-CPA, 2,4-D, 2,4-DB, 2,4-DEP, dichlorprop, fenoprop, IAA, IBA, naphthaleneacetamide, a-naphthaleneacetic acids, 1-naphthol, naphthoxyacetic acids, potassium naphthenate, sodium naphthenate, 2,4,5-T; D3) cytokinins, such as 2iP, benzyladenine, 4-hydroxyphenethyl alcohol, kinetin, zeatin; D4) defoliants, such as calcium cyanamide, dimethipin, endothal, ethephon, merphos, metoxuron, pentachlorophenol, thidiazuron, tribufos; D5) ethylene inhibitors, such as aviglycine, 1-methylcyclopropene; D6) ethylene releasers, such as ACC, etacelasil, ethephon, glyoxime; D7) gametocides, such as fenridazon, maleic hydrazide; D8) gibberellins, such as gibberellins, gibberellic acid; D9) growth inhibitors, such as abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, tiaojiean, 2,3,5-tri-iodobenzoic acid; D10) morphactins, such as chlorfluren, chlorflurenol, dichlorflurenol, flurenol; D11) growth retardants, such as chlormequat, daminozide, flurprimidol, paclobutrazol, tetcyclacis, uniconazole; D12) growth stimulators, such as brassinolide, brassinolide-ethyl, DCPTA, forchlorfenuron, hymexazol, prosuler, triacontanol; D13) unclassified plant growth regulators, such as bachmedesh, benzofluor, buminafos, carvone, choline chloride, ciobutide, clofencet, cyanamide, cyclanilide, cycloheximide, cyprosulfamide, epocholeone, ethychlozate, ethylene, fuphenthiourea, furalane, heptopargil, holosulf, inabenfide, karetazan, lead arsenate, methasulfocarb, prohexadione, pydanon, sintofen, triapenthenol, trinexapac.

In another aspect of the present invention, suitable combination of any one of insecticides, herbicides, fungicides, nematicides and plant growth promoters are provided to expand and provide better coverage in the furrow.

While those of ordinary skill in the art can appreciate that the presently disclosed system illustrate a low volume system for delivering suitable combinations in a larger crop area, and reducing the refill time, it can further expand the coverage in the furrow at higher volumes. For instance, in the case of sweet potatoes, one of ordinary skill in the art may decide to use 3-5 gallons of carrier to expand a foam that is 10-20× more than the amount used for corn. In such aspect of the invention, the objective is not necessarily to save water volume and reduce refill time, but instead to get much greater coverage or a much larger "Zone of Protection" than could have been achieved with standard liquid applications. In at least one embodiment, those of ordinary skill in the art would appreciate that added benefits in sweat potatoes due to the Zero tolerance for wireworms.

The active ingredient may be added to the foamable formulations of the present disclosure in any appropriate conventional form, for example an emulsion concentrate (EC), a suspension concentrate (SC), a suspo-emulsion (SE), a capsule suspension (CS), a water dispersible granule (WG), an emulsifiable granule (EG), a water in oil emulsion (EO), an oil in water emulsion (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a dispersible concentrate (DC) a wettable powder (WP) or any technically feasible formulation in combination with agriculturally acceptable adjuvants.

Suitable foaming agents may be nonionic surfactants, including alkanolamides (such as cocamide diethanolamide, lauric acid monosopropanolamide, and ethoxylated myristamide), xyethylene fatty acid esters, polyoxyethylene fatty alcohol ethers (such as alkylaryl polyglycol ethers) and fluorocarbons (such as ethoxylated polyfluorinated alcohol); anionic surfactants including alkyl-, alkylaryl- and arylsulfonates (such as sodium lauryl sarcosinate and such as sodium alkylbenzenesulfonate), alkyl-, alkylaryl- and arylsulfates, protein hydrolysates, derivatives of polycarboxylic acid (such as ammonium lauryl ether carboxylate), olefin sulfonates (such as sodium alpha olefin sulfonate), sarcosinates (such as ammonium cyclohexyl palmitoyl taurinate), succinates (such as disodium N-octadecyl sulfosuccinamate), phosphorus derivatives (such as phosphoric acid esters and their equivalent salts); cationic surfactants including alkylbenzyltrimethylammonium chloride; and amphoteric surfactants including betaine. Particularly preferred foaming agents are Bio-Soft D-40, Bioterge AS-40, Ammonyx DO, Ammonyx LO, Steol CA-330, Cedepal TD-407, and Polystep B-25. The total concentration of foaming agents in the formulation will be dependent on the foaming agents used, and may comprise between about 0.1% and about 50% of the final formulation, preferably between about 0.3% and about 30%, more preferably between about 5% and 25%, and even more preferably between about 17% and about 23%.

In at least one embodiment, the tank mix chemical formulation has a suitable viscosity to allow the active ingredient in the foamable formulation to be delivered at a range of tram 0.75-4.00 lbs a.i./gallon, and preferably from 0.75-2.00 lbs a.i./gallon. Such viscosity can range from 3 to 10,000 cps, preferably 10 to 7000 cps. In at least one embodiment, the viscosity of the formulation is adjusted to the speed of the apparatus to provide optimal foaming at a range of speeds including approximately 4-16 ounces of chemical formulation per acre, and 24-64 ounces of water per acre and a ground speed ranging from 2-7 miles per hour. In at least one embodiment, the present invention provides the delivery of the chemical formulation with at least 0.75 lbs a.i./gallon to be delivered at a rate of at least 0.25 gallons/acre. In another aspect of the instant invention, provides a foamable formulation with an expansion factor of at least 30, 40, 50, 60, 70, 80, 90, or 100.

Suitable foam stabilizers act to stabilize the foam generated from the liquid, foamable formulation. Examples of suitable foam stabilizers include glycerine, Kelzan, carrageenan, xanthan gum, guar gum, gum Arabic, gum tragacanth, polyox, alginin, and sodium alginate. Glycerine and Kelzan are particularly preferred. The total concentration of foam stabilizers in the formulation will be dependent on the foaming agents used, and may comprise between 0.1% and 1.5% of the total formulation, preferably 1-14%, more preferably 7-12%.

The foamable formulations of the present invention may also include dispersants, and/or preservatives. Suitable dispersants include nonionic and/or ionic substances, for example from the classes of the alcohol-POE and/or -POP ethers, acid and/or POP POE esters, alkylaryl and/or POP POE ethers, fat and/or POP POE adducts, POE- and/or POP-polyol derivatives, POE-and/or POP-sorbitan or -sugar adducts, alkyl or aryl sulfates, alkyl- or arylsulfonates and alkyl or aryl phosphates or the corresponding PO-ether adducts, and mixtures thereof. Alkyl polyglucosides and phosphate esters are preferred dispersants.

Suitable preservatives include but area not limited to C12 to C15 alkyl benzoates, alkyl p-hydroxybenzoates, aloe vera extract, ascorbic acid, benzalkonium chloride, benzoic acid, benzoic acid esters of C9 to C15 alcohols, butylated hydroxytoluene, butylated hydroxyanisole, tert-butylhydroquinone, castor oil, cetyl alcohols, chlorocresol, citric acid, cocoa butter, coconut oil, diazolidinyl urea, diisopropyl adipate, dimethyl polysiloxane, DMDM hydantoin, ethanol, ethylenediaminetetraacetic acid, fatty acids, fatty alcohols, hexadecyl alcohol, hydroxybenzoate esters, iodopropynyl butylcarbamate, isononyl iso-nonanoate, jojoba oil, lanolin oil, mineral oil, oleic acid, olive oil parabens, polyethers, polyoxypropylene butyl ether, polyoxypropylene cetyl ether, potassium sorbate, propyl gallate, silicone oils, sodium propionate, sodium benzoate, sodium bisulfite, sorbic acid, stearic fatty acid, sulfur dioxide, vitamin E, vitamin E acetate and derivatives, esters, salts and mixtures thereof. Preferred preservatives include sodium o-phenylphenate, 5-chloro-2-methyl-4-isothiazolin-3-one, 2-methyl-4-isothiazolin-3-one, and 1,2-benisothiazolin-3-one.

Definitions

The following terms shall have the respective meanings set forth below.

"Agricultural agent" means a bioactive agent used in agriculture, such as a herbicide, pesticide, insecticide, fungicide, or fertilizer. "Bioactive agent" means a substance such as a chemical that can act on a cell, virus, organ or organism, including but not limited to insecticides, fungicides and herbicides, which substance creates a change in the functioning of the cell, virus, organ or organism.

A particle size, D90, shall mean that at least about 90% of the particles in the composition are smaller than the given D90, as measured by Horiba LA920 particle size analyzer.

"25% Drain Time," or DT25, is a measure of a foam's static stability and is the time required for 25% of a foam's volume to disintegrate.

EXAMPLES

Example 1

Bifenthrin technical (514.29 g) was combined with Agnique® PC9116 (35.00 g, available from Cognis Corp.), Dextrol™ OC-180 (35.00 g, available from Ashland Inc.), and deionized water (815.7 g), then milled until the bifenthrin was reduced to a D90 of less than 2 microns. The resulting bifenthrin SC was then mixed in a low-speed mixer with glycerine, Stepwet® DF-95 (available from Stepan. Co.), Bio-soft® D-40 (available from Stepan Co.), Ammonyx® DO (available from Stepan Co.), Kathon™ CG/ICP (available from Dow Chemical Co.), Kelzan® (2% aqueous solution), and deionized water to create 18 foamable formulations. Compositions are given as weight percent of total formulation in the following tables.

| Formulation No. | 1-1 | 1-2 | 1-3 | 1-4 | 1-5 | 1-6 | 1-7 | 1-8 | 1-9 | 1-10 |
|---|---|---|---|---|---|---|---|---|---|---|
| Bifenthrin SC | 60.9 | 60.9 | 60.9 | 60.9 | 60.9 | 60.9 | 60.9 | 60.9 | 60.9 | 60.9 |
| Glycerine | 11.0 | 11.0 | 11.0 | 11.0 | 11.0 | 11.0 | 11.0 | 11.0 | 11.0 | 11.0 |
| Stepwet DF-95 | 5.0 | 3.8 | 3.8 | 1.3 | 2.5 | 10.0 | 5.0 | 0.0 | 7.5 | 7.5 |
| Biosoft D-40 | 7.5 | 1.9 | 4.4 | 1.9 | 13.8 | 0.0 | 5.0 | 0.0 | 8.8 | 3.8 |
| Ammonyx DO | 7.5 | 4.4 | 1.9 | 6.9 | 3.8 | 10.0 | 0.0 | 10.0 | 3.8 | 8.8 |
| Kathon ICP/CG | 0.1 | 0.1 | 0.1 | 0.1 | 0.1 | 0.1 | 0.1 | 0.1 | 0.1 | 0.1 |
| Kelzan 2% | 8.0 | 8.0 | 8.0 | 8.0 | 8.0 | 8.0 | 8.0 | 8.0 | 8.0 | 8.0 |
| Water | 0.0 | 9.9 | 9.9 | 9.9 | 0.0 | 0.0 | 10.0 | 10.0 | 0.0 | 0.0 |

| Formulation No. | 1-11 | 1-12 | 1-13 | 1-14 | 1-15 | 1-16 | 1-17 | 1-18 |
|---|---|---|---|---|---|---|---|---|
| Bifenthrin SC | 60.9 | 60.9 | 60.9 | 60.9 | 60.9 | 60.9 | 60.9 | 60.9 |
| Glycerine | 11.0 | 11.0 | 11.0 | 11.0 | 11.0 | 11.0 | 11.0 | 11.0 |
| Stepwet DF-95 | 10.0 | 2.5 | 0.0 | 2.5 | 0.0 | 5.0 | 1.3 | 0.0 |
| Biosoft D-40 | 10.0 | 3.8 | 10.0 | 3.8 | 20.0 | 0.0 | 6.9 | 0.0 |
| Ammonyx DO | 0.0 | 3.8 | 0.0 | 13.8 | 0.0 | 5.0 | 1.9 | 20.0 |
| Kathon ICP/CG | 0.1 | 0.1 | 0.1 | 0.1 | 0.1 | 0.1 | 0.1 | 0.1 |
| Kelzan 2% | 8.0 | 8.0 | 8.0 | 8.0 | 8.0 | 8.0 | 8.0 | 8.0 |
| Water | 0.0 | 9.9 | 10.0 | 0.0 | 0.0 | 10.0 | 9.9 | 0.0 |

Example 2

Bifenthrin technical (514.29 g) was combined with Agnique PG9116 (35.00 g), Dextrol OC-180 (35.00 g), and deionized water (815.71 g), then milled until the bifenthrin was reduced to a D90 of less than 2 microns. The resulting bifenthrin SC was then mixed in a low-speed mixer with glycerine, Stepwet DF-95, Biosoft D-40, Ammonyx DO, Kathon CG/ICP, Proxel™ GXL (available from Arch Chemicals), Kelzan 2%, and deionized water to create the following three foamable formulations. Compositions are given as weight percent of total formulation.

| Formulation No. | 2-1 | 2-2 | 2-3 |
|---|---|---|---|
| Bifenthrin SC | 61.12 | 61.12 | 61.12 |
| Glycerine | 11.00 | 11.00 | 11.00 |
| Stepwet DF-95 | 2.45 | 3.75 | 3.75 |
| Biosoft D-40 | 7.55 | 1.88 | 4.38 |
| Ammonyx DO | 0.00 | 4.38 | 1.88 |
| Kathon ICP/CG | 0.15 | 0.15 | 0.15 |
| Proxel GXL | 0.15 | 0.15 | 0.15 |
| Kelzan 2% | 12.00 | 12.00 | 12.00 |
| Water (%) | 5.58 | 5.58 | 5.58 |

Example 3

Bifenthrin technical (514.29 g) was combined with Agnique PG9116 (35.00 g), Dextrol OC-180 (35.00 g), and deionized water (815.71 g), then milled until the bifenthrin was reduced to a D90 of less than 2 microns. The resulting bifenthrin SC was then mixed in a low-speed mixer with glycerine, Stepwet DF-95, Biosoft D-40, Bio-Terge® AS-40 (available from Stepan Co.), Kathon ICP/CG, Proxel GXL, Kelzan 2%, and deionized water to create the following foamable formulations.

| Formulation No. | 3-1 | 3-2 | 3-3 | 3-4 | 3-5 | 3-6 | 3-7 | 3-8 | 3-9 | 3-10 |
|---|---|---|---|---|---|---|---|---|---|---|
| Bifenthrin SC (%) | 47.65 | 47.65 | 47.65 | 47.65 | 47.65 | 47.65 | 47.65 | 47.65 | 47.65 | 47.65 |
| Glycerine | 10.00 | 10.00 | 10.00 | 10.00 | 10.00 | 10.00 | 10.00 | 10.00 | 10.00 | 10.00 |
| Stepwet DF-95 | 0.67 | 0.00 | 0.00 | 4.00 | 2.67 | 2.67 | 0.67 | 0.67 | 0.00 | 0.00 |
| Bio-Soft D-40 | 3.11 | 4.00 | 0.00 | 0.00 | 3.11 | 11.11 | 11.11 | 5.11 | 0.00 | 4.00 |
| Bio-Terge AS-40 | 5.11 | 16.00 | 16.00 | 0.00 | 11.11 | 3.11 | 5.11 | 3.11 | 4.00 | 0.00 |
| Steol CA-330 | 11.11 | 0.00 | 4.00 | 16.00 | 3.11 | 3.11 | 3.11 | 11.11 | 16.00 | 16.00 |
| Kathon ICP/CG | 0.15 | 0.15 | 0.15 | 0.15 | 0.15 | 0.15 | 0.15 | 0.15 | 0.15 | 0.15 |
| Proxel GXL | 0.15 | 0.15 | 0.15 | 0.15 | 0.15 | 0.15 | 0.15 | 0.15 | 0.15 | 0.15 |
| Kelzan 2% | 17.00 | 17.00 | 17.00 | 17.00 | 17.00 | 17.00 | 17.00 | 17.00 | 17.00 | 17.00 |
| Water | 5.05 | 5.05 | 5.05 | 5.05 | 5.05 | 5.05 | 5.05 | 5.05 | 5.05 | 5.05 |
| $DT_{25}$ (mins) | 59 | 69 | 63 | 50 | 54 | 48 | 50 | 49 | 55 | 58 |

| Formulation No. | 3-11 | 3-12 | 3-13 | 3-14 | 3-15 | 3-16 | 3-17 | 3-18 | 3-19 |
|---|---|---|---|---|---|---|---|---|---|
| Bifenthrin | 47.65 | 47.65 | 47.65 | 47.65 | 47.65 | 47.65 | 47.65 | 47.65 | 47.65 |
| Glycerine | 10.00 | 10.00 | 10.00 | 10.00 | 10.00 | 10.00 | 10.00 | 10.00 | 10.00 |
| Stepwet DF-95 | 4.00 | 2.67 | 1.33 | 4.00 | 0.00 | 0.67 | 0.00 | 0.67 | 0.67 |
| Bio-Soft D-40 | 0.00 | 3.11 | 6.22 | 16.00 | 16.00 | 3.11 | 16.00 | 11.11 | 5.11 |
| Bio-Terge AS-40 | 16.00 | 3.11 | 6.22 | 0.00 | 4.00 | 11.11 | 0.00 | 3.11 | 11.11 |
| Steol CA-330 | 0.00 | 11.11 | 6.22 | 0.00 | 0.00 | 5.11 | 4.00 | 5.11 | 3.11 |
| Kathon ICP/CG | 0.15 | 0.15 | 0.15 | 0.15 | 0.15 | 0.15 | 0.15 | 0.15 | 0.15 |
| Proxel GXL | 0.15 | 0.15 | 0.15 | 0.15 | 0.15 | 0.15 | 0.15 | 0.15 | 0.15 |
| Kelzan 2% | 17.00 | 17.00 | 17.00 | 17.00 | 17.00 | 17.00 | 17.00 | 17.00 | 17.00 |
| Water | 5.05 | 5.05 | 5.05 | 5.05 | 5.05 | 5.05 | 5.05 | 5.05 | 5.05 |
| $DT_{25}$ (mins) | 77 | 65 | 60 | 56 | 55 | 70 | 62 | 63 | 50 |

Example 4

Bifenthrin technical (1628.4 g) was combined with Agnique PG9116 (100.00 g), Dextrol OC-180 (100.00 g), and deionized water (2171.60 g), then milled until the bifenthrin was reduced to a D90 of less than 2 microns. The resulting bifenthrin SC was then mixed in a to mixer with glycerine, Stepwet DF-95, Biosoft D-40, Bio-Terge AS40, Steol CA-330, Polystep B-25, Kathon ICP/CG, Dowicide A, Proxel GXL, and/or Kelzan 2% to create the following foamable formulations:

| Formulation No. | 4-1 | 4-2 | 4-3 | 4-4 |
|---|---|---|---|---|
| Bifenthrin SC | 50.00 | 50.00 | 50.00 | 50.00 |
| Glycerine | 12.70 | 12.70 | 12.70 | 12.70 |
| Stepwet DF-95 | 1.00 | 2.00 | 2.00 | 0.00 |
| Bio-Soft D-40 | 0.00 | 4.00 | 14.00 | 0.00 |
| Bio-Terge AS-40 | 3.00 | 14.00 | 4.00 | 0.00 |
| Steol CA-330 | 16.00 | 0.00 | 0.00 | 0.00 |
| Polystep B-25 | 0.00 | 0.00 | 0.00 | 20.00 |
| Kathon ICP/CG | 0.10 | 0.10 | 0.10 | 0.10 |
| Dowicide A | 0.10 | 0.10 | 0.10 | 0.10 |
| Proxel GXL | 0.10 | 0.10 | 0.10 | 0.10 |
| Kelzan 2% | 17.00 | 17.00 | 17.00 | 17.00 |

These formulations were tested on a field test unit to determine their foaming characteristics, including stability when pumped through a conduit and expansion factor. The formulations were tank mixed with water, and the resulting fluid was foamed and applied with a four-row configuration at a speed of 5.2 mph and a rate of 32 oz./acre. (0.1 lbs a.i./acre).

Expansion Rates

| Formulation | With 15 PSI Air Pressure | | | | 18 PSI | 20 PSI Air | | Ave. |
|---|---|---|---|---|---|---|---|---|
| | Row | Row | Row | Row | Row 1 | Row | Row 4 | |
| 4-1 | 17x | 20x | 23x | 22x | | | | 20.5x |
| 4-2 | 23x | 25x | 20x | 24x | | | | 23x |
| 4-3 | 22x | 25x | 25x | 19x | | | | 22.75x |
| 4-4 | 35x | 33x | 33x | 40x | 30x | 27x | 27x | 32.6x |

Example 5

Bifenthrin technical (95.8%) was added to Agnique PG 116 and Dextrol OC480 and milled until reduced to a $D^{90}$ of less than 4 microns. The remaining ingredients were added in the proportions given below and mixed in a low speed mixer:

| Bifenthrin 1.6 SC | |
|---|---|
| | % w/w |
| Bilenthrin Technical, 95.8% | 18.40 |
| Glycerine | 12.70 |
| Agnique PG9116 | 1.25 |
| Dextrol OC-180 | 1.25 |
| Polystep B-25 | 20.00 |
| Kathon ICP/CG | 0.10 |
| Dowicide A | 0.10 |
| Proxel GXL | 0.10 |
| Water | 45.78 |
| Kelzan | 0.32 |
| | 100.00 |

This formulation was tested on a field test unit to determine its foaming characteristics, including stability when pumped through a conduit and expansion factor. The formulation was tank mixed with water, to an active ingredient concentration of 4.6%, and the resulting fluid was foamed and applied with a four-row configuration at a speed of 5.2 mph and a rate of 32 oz./acre (0.1 lbs a.i./acre). The four rows generated expansion factors of 40.0, 45.7, 46.7, and 44.5 (mean 44.2).

Delivery System

In accordance with another aspect of the present disclosure, a delivery system 10 is provided for installation on agricultural equipment (e.g., seed planters) that delivers the high expansion foam, as described above, in the seed furrow using an ultra-low rate of water carrier. The apparatus and corresponding methods of this delivery system can be incorporated into an original equipment manufacturer (OEM) design and fabricated as a new machine, or alternatively, provided as a kit for retro-fitting existing agricultural equipment. Additionally, while the delivery system is described herein integrated with agricultural equipment, it is further contemplated that components of the system may be incorporated in a standalone delivery system, for example, a backpack delivery system that can be utilized by an individual farmer.

The system applies a foaming formulation, as described above, into the furrow with a total volume of water and chemical used of, for example, 32 to 64 ounces per acre. The system utilizes water, compressed air, and the foaming chemical formulation to generate the high expansion aqueous foam which is then delivered to the individual seed row furrows.

Additionally, the system 10 described herein automatically adjusts the amount of water and chemical being used to maintain the proper application rate depending on section width and speed of the planter, as well as distributing the foam evenly between rows and monitoring the flow of foam to each these rows for volume, quality and blockage.

Referring to FIGS. 1-12, an exemplary delivery system 10 in accordance with an embodiment of the invention will be described. With reference to FIG. 1, the delivery system 10 includes a control module 12, a tank and pump assembly 100, 200, a valve assembly 20, 30, foam mixing chambers 40, monitoring units 70, control valves 80 and delivery nozzles 84. The control module 12 includes a "computing device" or "electronic device" that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data anchor instructions. Examples of computing, devices or electronic devices include, without limitation, personal computers, servers, mainframes, and portable electronic devices such as smartphones, personal digital assistants, tablet computers, laptop computers and the like. The control module 12 may be a standalone device or may be integrated with computing or electronic devise already provided on the agricultural equipment.

The control module 12 is configured to communicate with the agricultural equipment to monitor the operating state of the agricultural equipment, for example, the ground speed of the equipment and the operational state of each planter (e.g. planting or not planting, seed delivery rate). The control module 12 is also configured to communicate with various components of the delivery system to receive operational information from the components and to send control signals to the components as will be described in more detail hereinafter. The control module 12 may also be configured to communicate with a remote network. The control module 12 may send information to the remote network, for example, operating history of the delivery system 10, such that the information may be stored, analyzed or otherwise used apart from the delivery system 10. The control module 12 may receive information from the remote network which may assist with control of the components. For example, historical data on chemical selection and application rate for a given crop in a given region may be communicated to the control module 12 to facilitate optimization of the delivery system 10. Other storage, processing and control may be completed utilizing the control module 12, alone or in combination with the remote network.

Figure 2:
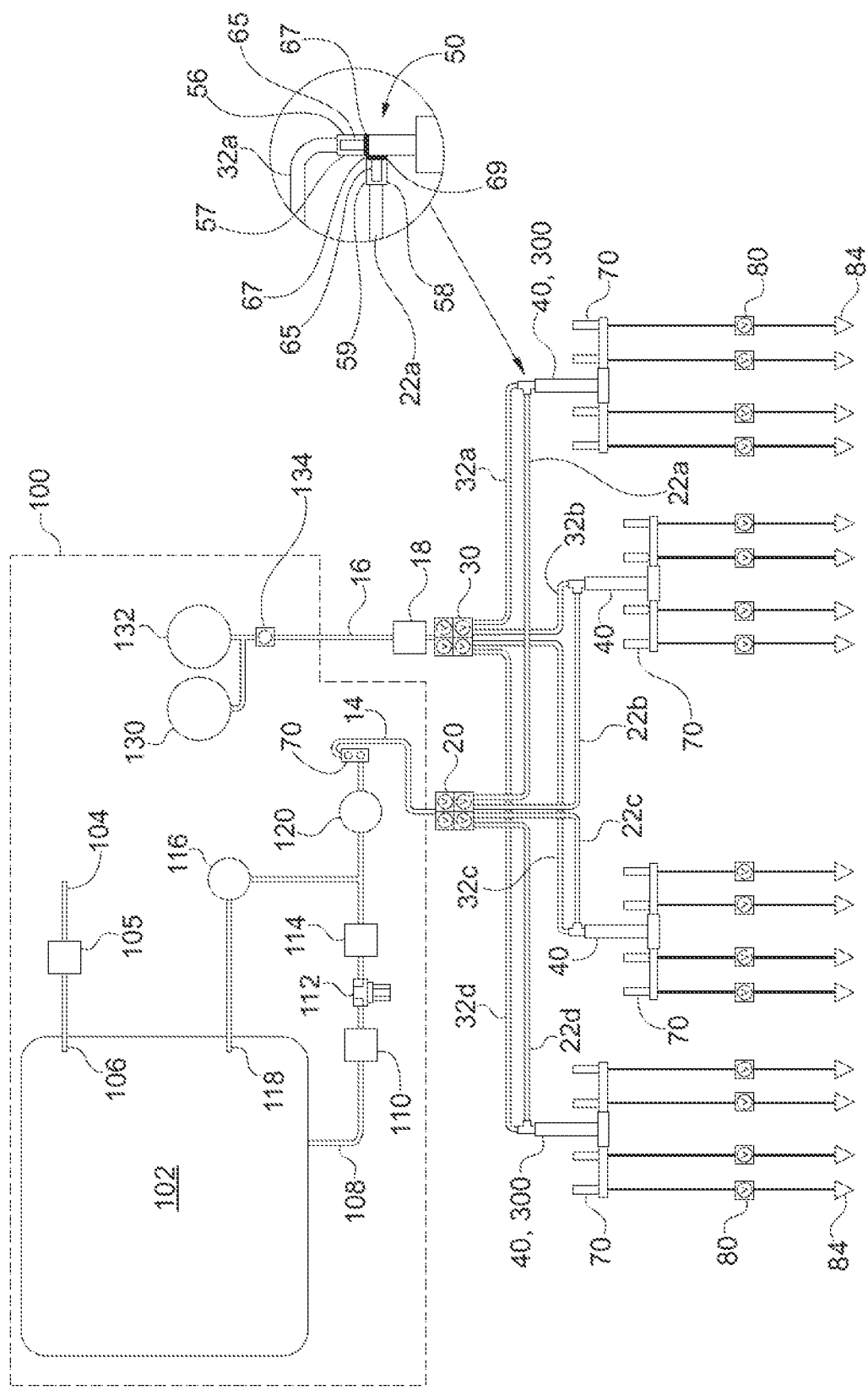
FIG. 2 is a schematic representation of an exemplary tank mixing system in conjunction with a delivery system in accordance with an embodiment of the invention.

Referring to FIG. 2, an exemplary tank and pump assembly 100 in accordance with an embodiment of the invention will be described. In the present embodiment, the chemical formulation and water are contained within a single tank 102 (referred to as "tank mixing" herein). The tank 102 has a sufficient capacity (e.g. 150 gallons). The water conduit (or line, which may be used interchangeably throughout this disclosure) 104 is coupled to the tank 102 to provide water from an external source for mixing with the chemical formulation. The water conduit includes a valve 105 for controlling the flow of water and can be operated on a continuous or intermittent basis, as so desired. Additionally, a tank rinse nozzle 106 can be incorporated into water conduit 104 which can accelerate and disperse the water about the interior of the tank at sufficient pressure to remove any chemical residue or debris. Although the exemplary embodiment disclosed herein describes conduit 100 as a water delivery line, it will be understood by artisans of ordinary skill that a medium other than, or in addition to, water can be employed in the system described herein.

The tank mix configuration of the present system mixes the chemical formulation with water in a single tank to achieve the desired application rate of both water and chemical formulation. The mixed solution exits the tank through a line 108 and a hand controlled ball valve 110 into a strainer 112. The line contains a tee that will allow for a vacuum switch 114, which monitors the line to verify that there is solution in the system. The vacuum switch is preferably in communication with the control module 12, and if no solution is detected, the control module 12 can generate an alarm to alert an operator to check for blockages, or a shut off signal to terminate the system operation. Further downstream the line then tees again to allow for an optional pump 116 that can be used for agitation. In some embodiments, the pump 116 and agitation line 118 are provided to deliver a medium, e.g. water, into the tank at a controlled pressure so as to stir up the solution. Alternatively, the chemical formulation employed within the system may remain stable and dispersed without the need for agitation, thereby rendering the agitation pump and line unnecessary.

The main line 108 then enters a pump 120 which is monitored by the control module 12 to maintain an optimal flow rate. The speed of the pump is adjusted by the control module 12 to maintain the desired rate based on various factors, for example, ground speed or section width of the planter. In one embodiment, the pump 120 is a 12-volt electric positive displacement metering pump that is rated for a maximum flow of 44 ounces per minute. The pump is preferably a positive displacement, non-return metering pump. Downstream of the pump 120, the fluid stream (i.e. mixture of chemical formulation and water) then continues to a solenoid valve manifold block 20 through line 14. A monitoring unit 70 may be positioned along the line 14 to insure the flow has not been interrupted.

Figure 9:
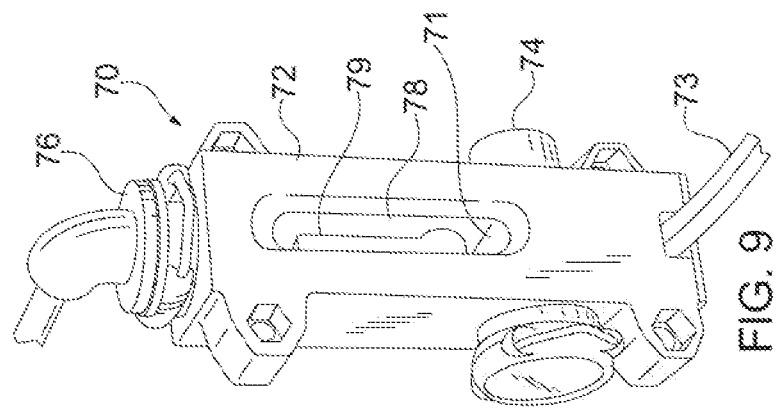
FIG. 9 is a perspective view of a monitoring unit in accordance with an embodiment of the invention.
Figure 16:
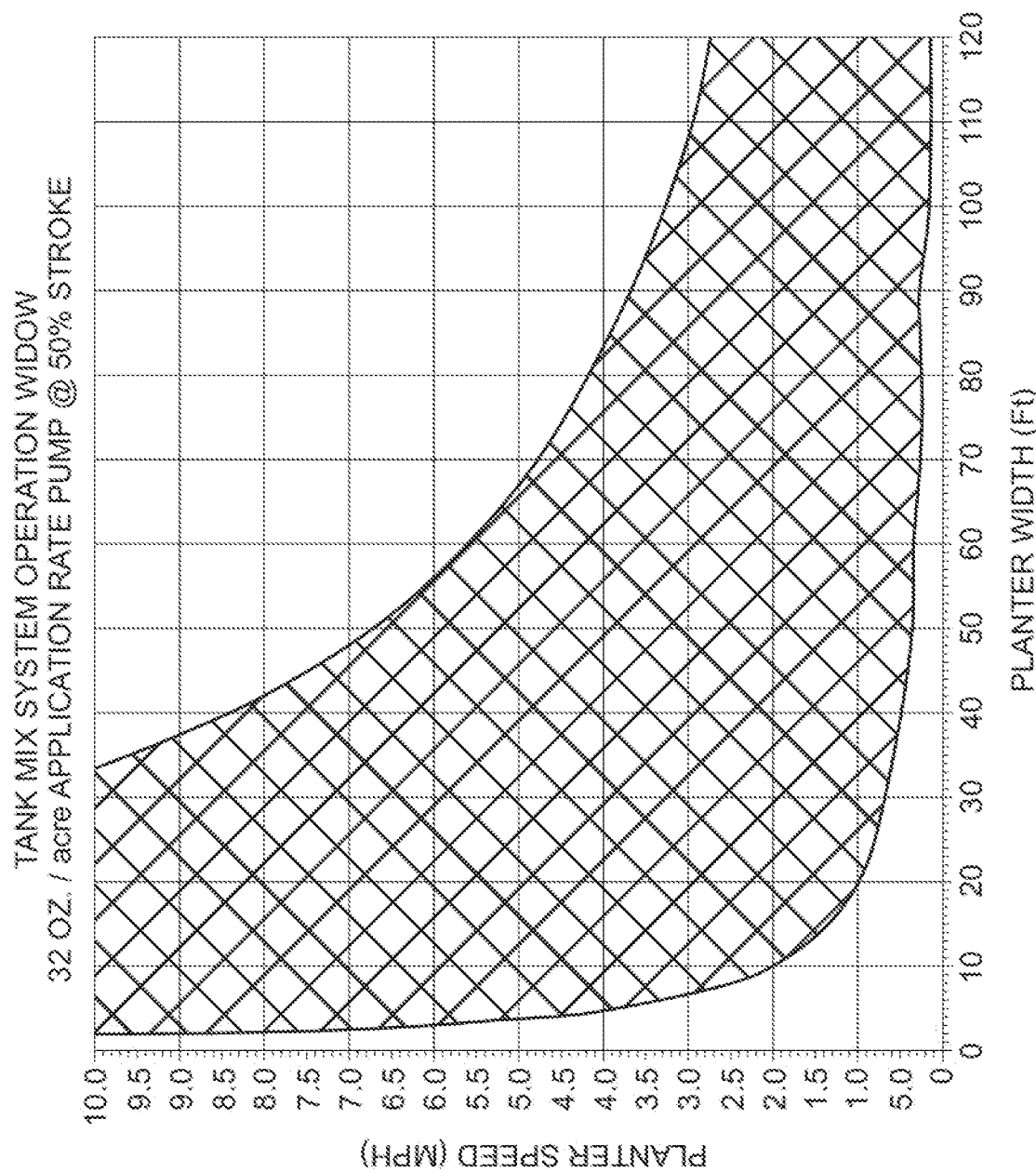
Figure 17:
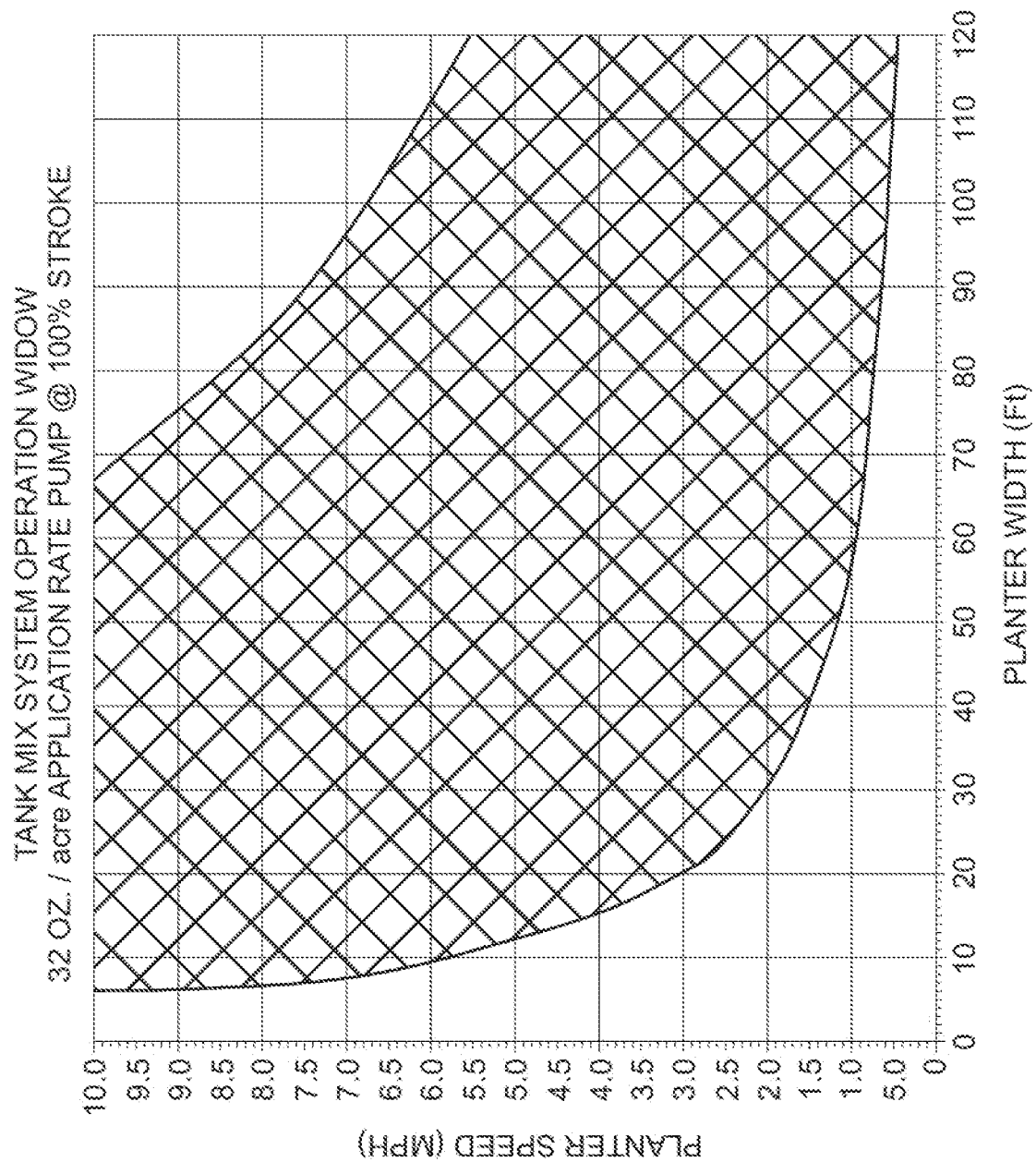

FIG. 9 depicts an exemplary monitoring unit 70. As shown, the monitoring unit 70 includes a housing 72 with an internal chamber 78 with an inlet 74 and an outlet 76. A contact 71 is provided at the bottom of the chamber 78 and a cartridge 79 is configured to move within the chamber 78. The cartridge 79 is configured such that when proper flow exists between the inlet 74 and the outlet 76, the cartridge 79 is suspended within the chamber 78 and spaced from the contact 71. If the flow is blocked or otherwise improper, the cartridge 79 drops and contacts the contact 71, thereby causing a signal indicating improper flow to be sent through wires 73 (or wirelessly) to the control module 12. Upon receipt of such a signal, the control module 12 can generate an alarm to alert an operator to check for blockages and/or a shut off signal to terminate the system operation.

The manifold 20 divides the fluid stream into four separate sub-streams 22*a-d*, with each sub-stream directed towards a respective foam mixing chamber 40. Manifold 20 houses a valve (e.g. solenoid) for each of the sub-streams 22*a-d*, which can operate independently of each other under the control of the control module 12. Accordingly, only select lines 22*a-d* can be operated at a given time. Likewise, a first line can be operated in a first mode (e.g. continuously) while a second line can be operated in a second mode e.g. intermittingly).

A compressed air line 16 is also provided which includes one or more compressors 130, 132. From the compressor(s), the air line passes thru a relief valve 134 which allows the high pressure air that can buildup on the compressor diaphragm to be evacuated. The small diaphragm compressors that are being used will not start with high pressure on them, and to help with power consumption form the tractor, the compressor(s) are started with only atmospheric pressure on them. From the relief valve 124, the high pressure air flows thru a pressure regulator 18, through a second valve manifold 30 and to a respective foam mixing chamber 40. Manifold 30 houses a valve (e.g. solenoid) for each of the sub-streams 32*a-d*, which can operate independently of each other under the control of the control module 12. Accordingly, only select lines 32*a-d* can be operated at a given time. Likewise, a first line can be operated in a first mode (e.g. continuously) while a second line can be operated in a second mode (e.g. intermittingly).

Figure 3:
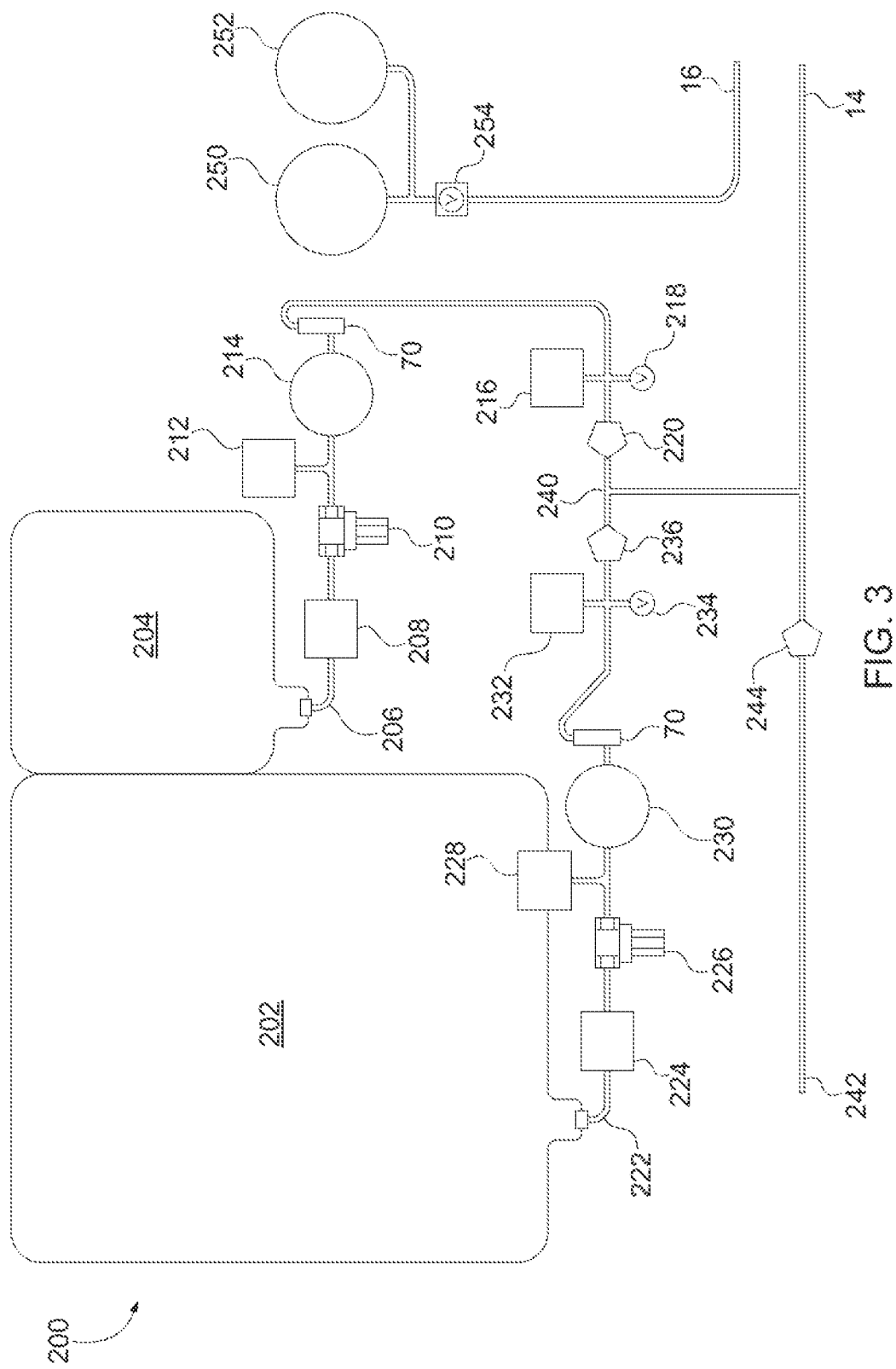
FIG. 3 is a schematic representation of an exemplary injection mixing system which may be utilized within the delivery system.

Prior to explaining the continued flow through the foam mixing chambers and beyond, another exemplary tank and pump assembly 200 in accordance with an embodiment of the invention will be described with reference to FIG. 3. In the tank and pump assembly 200, the chemical formulation and medium (e.g. water) are housed in separate containers, metered by separate systems and mixed in line and downstream of their respective containers ("injection mixing").

More specifically, the water is stored in a first tank 202 and the chemical is kept in a separate tank 202. While only one chemical tank is illustrated, it is contemplated that more than one chemical tank may be provided whereby the control module 12 may select a desired chemical for a specific application and/or may mix multiple chemicals to achieve the desired foamable formation.

The chemical stream exits the chemical tank 204 thru a line 206 and a hand controlled ball valve 208 into a strainer 210. The line 206 contains a tee that will allow for a vacuum switch 212 which will monitor the line to verify that there is chemical in the system and no blocks in the supply line. The vacuum switch 212 is preferably in communication with the control module 12, and if no chemical is detected, the control module 12 can generate an alarm to alert an operator to check for blockages, or a shut off signal to terminate the system operation. The chemical line then enters a metering pump 214. The pump 214 may be, for example, a 12-volt electric positive displacement pump that is rated for a maximum flow of 20 ounces per minute. The pump is monitored by the control module 12 for flow rate. For example, the control module 12 may monitor the pump's speed with a magnet wheel and a Hall Effect sensor. The speed of the pump 214 is adjusted by the control module 12 to maintain the desired rate based on ground speed, width and/or GPS derived prescription. The chemical stream then continues thru a monitoring unit 70, as described above, that monitors if the flow of chemical has been interrupted. The chemical line then continues on to a cross with an electronic pressure transducer 216 and a hydrostatic relief valve 218 to protect the pump 214. The chemical line then continues through a check valve 220 and on to a tee or mixing device 240.

The water stream exits the chemical tank 202 that a line 222 and a hand controlled ball valve 224 into a strainer 226. The line contains a tee that will allow for a vacuum switch 228 which monitors the line to verify that there is water in the system and no blocks in the supply line. The vacuum switch 228 is preferably in communication with the control module 12, and if no water is detected, the control module 12 can generate an alarm to alert an operator to check for blockages, or a shut off signal to terminate the system operation. The water line then enters a metering pump 230. The pump 230 may be, for example, a 12-volt electric positive displacement pump that is rated for a maximum flow of 40 ounces per minute. The pump 230 is monitored by the control module 12 for flow rate. For example, the control module 12 may monitor the pump's speed with a magnet wheel and a Hall Effect sensor. The speed of the pump 230 is adjusted by the control module 12 to maintain the desired rate based on ground speed, width author GPS derived prescription. The water stream then continues thru a monitoring unit 70, as described above, that monitors if the flow of chemical has been interrupted. The water line then continues to a cross with an electronic pressure transducer 232 and a hydrostatic relief valve 234 to protect the pump 230. The water line then continues through a check valve 236 and on to the tee or mixing device 240. The now mixed solution of water and foamable formulation continues on to a valve manifold block 20 via the line 14 similar and continues therefrom as described with respect to the previous embodiment. A flush line 242 may be connected with the line 14 via a check valve 244.

Similar to the previous embodiment, a compressed air line 16 is also provided which includes one or more compressors 250, 252. From the compressor(s), the air line passes thru a relief valve 254 which allows the high pressure air that can buildup on the compressor diaphragm to be evacuated. The small diaphragm compressors that are being used will not start with high pressure on them, and to help with power consumption form the tractor, the compressor(s) are started with only atmospheric pressure on them. From the relief valve 254, the high pressure air flows to the pressure regulator 18 and then continues in the manner described with respect to the previous embodiment.

Figure 5:
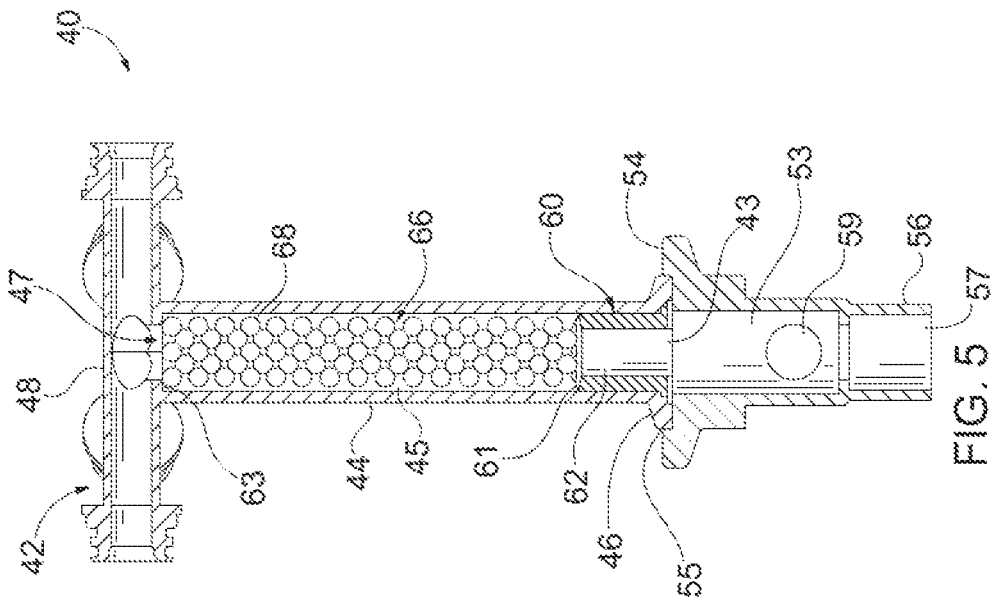
FIG. 5 is a cross-sectional view through the foam mixing chamber of FIG. 4.
Figure 4:
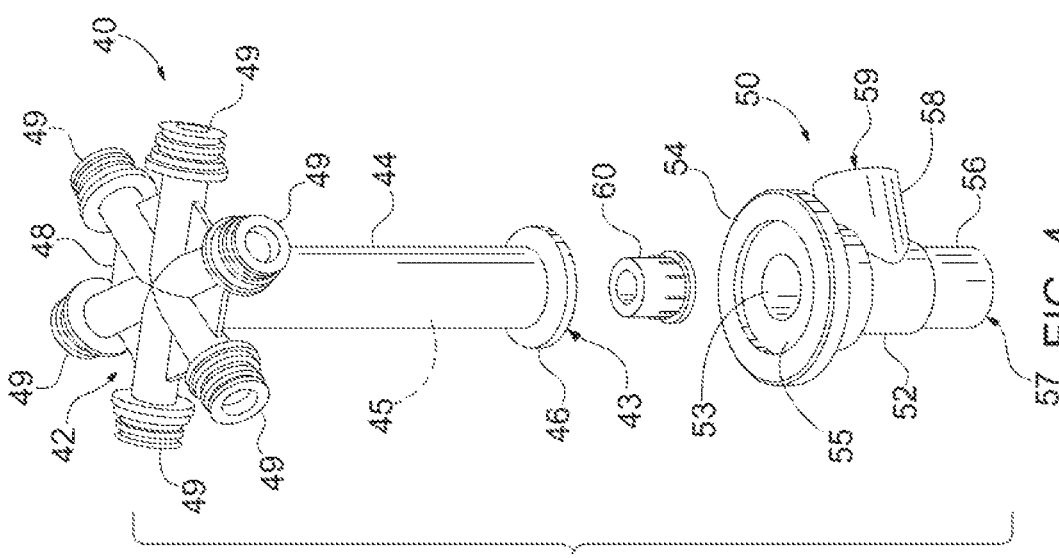
FIG. 4 is an exploded perspective view of an exemplary foam mixing chamber in accordance with an embodiment of the invention.

Referring again to FIGS. 1 and 2, flow through the delivery system 10 after the valve manifolds 20 and 30 will be described. The individual section lines 22a-d and 32a-d carry the liquid and air flows to a respective foam mixing chamber 40. In the foam mixing chamber 40, the air and fluid streams mix and create the desired high expansion foam. Referring to FIGS. 2 and 4-5, each foam mixing chamber 40 includes a chamber body 42 and a mixing tee 50. The chamber body 42 includes a tube 44 with a hollow interior chamber 45. The chamber 45 is communication with an inlet port 43 and a manifold head 48 via an internal passage 47. The manifold head 48 defines a plurality of outlet ports 49, in the illustrated embodiment, the manifold head 48 is provided with six outlet ports 49, however, more or fewer outlet ports 49 may be provided. Additionally, ports 49 which are not needed may be capped. In the illustrated embodiment, a flange 46 is provided about the inlet port 43 for connection with the mixing tee 50.

The mixing tee 50 includes a body 52 with a connection flange 54 extending about the tee outlet port 53. A seat 55 is provided to receive the flange 46 such that the tee outlet port 53 is in communication with the inlet port 43. In the illustrated embodiment, the flange 46 connects within the seat 55 with an interference fit. However, alternative coupling arrangements (e.g. threaded connection, tongue-and-grove mating, etc.) can be employed. Furthermore, in some embodiments the mixing tee 50 can be formed integrally with the chamber body 42 such that the assembly is a unitary component. The tee body 52 defines an air connection 56 with an inlet port 57 and a fluid connection 58 with an inlet port 59. Both ports 57 and 59 are in communication with the tee outlet port 53. Referring to FIG. 2, air coining from the air line 32a-d preferably passes through a check valve strainer 65 and an orifice plate 67 as it enters the port 59. The orifice plate 67 includes a through hole sized to permit passage of a desired air flow. Similarly, fluid coming from the fluid line 22a-d passes through a check valve strainer 65, an orifice core 69 and an orifice plate 67. The orifice plate 67 again includes a through hole sized to permit passage of a desired fluid flow while the orifice core 69 engages the fluid flow and begins to agitate the foamable formulation.

Referring to FIG. 5, the interior chamber 45 houses a foaming medium 66 configured to agitate the foamable formulation as it passes through the chamber 45. In the illustrated embodiment, the foaming medium 66 includes a plurality of glass spheres 68 packed tightly within the chamber 45. The spheres 68 are chosen to have a size which provides a desired amount of surface contact area to achieve the desired foam expansion. As an example, the spheres 68 may have a diameter of 5-6 mm. Additionally, the length of the chamber 45 may similarly be selected to achieve a desired expansion. It is contemplated that other foaming mediums may be utilized, for example, steel wool, provided the medium provides a predictable rate of expansion. To maintain the foaming medium 66, an upper screen 63 is positioned over the internal passage 47 and a lower screen 61 is maintained by a locking plug 60 positioned in the inlet port 43. The locking plug 60 includes a through passage 62 to allow flow into the chamber 45. The locking plug 60 may have an interference fit, threaded fit or the like.

In operation, the mixture of chemical formulation and water (or "solution") enterers the foam mixing chamber 40 through the inlet port 59 on the mixing tee 50 and the compressed air stream enters the inlet port 59 of the mixing tee 50. The pressured air flow through the inlet port 59 drives the solution into the interior chamber 45 such that the solution passes through foaming medium 66 and foams. The foamed solution exits through the internal passage 47 into the manifold head 48 from which the foamed solution is distributed through the outlet ports 49. The foam mixing chamber 40 is preferably oriented in a vertical orientation with the outlet ports 49 above the inlet ports 57, 59. Such vertical orientation is believed to improve the foam quality and/or prevent the solution from pooling in the mixing chamber 45.

Figure 6:
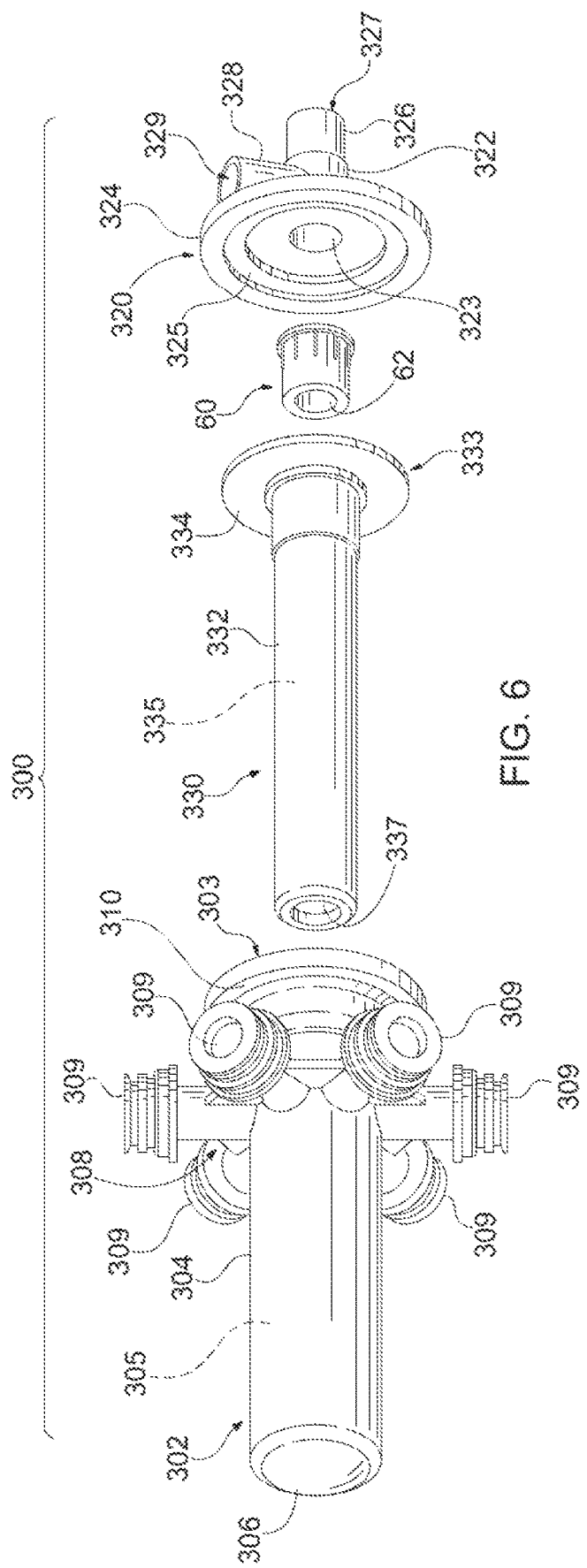
FIG. 6 is an exploded perspective view of another exemplary foam mixing chamber in accordance with an embodiment of the invention.

Referring to FIGS. 6-8, another exemplary foam mixing chamber 300 in accordance with the invention will be described. The foam mixing chamber 300 generally includes an outer housing member 300, a mixing tee 320 and an internal divider member 330. The outer housing member includes a tube 304 with a hollow interior chamber 305 extending between an open end 303 to a closed end 306. A manifold head 308 is provided proximate the open end 303 and defines a plurality of outlet ports 309 in communication with the interior chamber 305. In the illustrated embodiment, the manifold head 308 is provided with six outlet ports 309, however, more or fewer outlet ports 309 may be provided. Additionally, ports 309 which are not needed may be capped. In the illustrated embodiment, a flange 310 is provided about the open end 303 for connection with the mixing tee 320.

The mixing tee 320 is similar to the previous embodiment and includes a body 322 with a connection flange 324 extending about the tee outlet port 323. A seat 325 is provided to receive a flange 134 of the internal divider member 330 as described below. The tee body 322 defines an air connection 326 with an inlet port 327 and a fluid connection 328 with an inlet port 329. Both ports 327 and 329 are in communication with the tee outlet port 323. As in the previous embodiment, a check valve strainer 65, an orifice plate 67 and/or an orifice core 69 may be positioned in the ports 327, 329.

The internal divider member 330 includes a tubular body 332 defining an interior chamber 335 extending between an inlet port 333 and an outlet port 337. A flange 334 is provided about the inlet port 333 such that when it is seated in the seat 325 of the mixing tee 320, the inlet port 333 is aligned with the tee outlet port 323. Referring to FIG. 8, upon assembly, the interior divider member 330 defines a passage 311 between the outer housing member 302 and the interior divider member 330. The passage 311 communicates between the outlet port 337 and the outlet ports 309. The flange 334 seals with respect to the outer housing member 302 such that the tee outlet 323 is not in communication with the passage 311, an instead flow from the mixing tee 320 must flow through the plug passage 62 and into the interior chamber 335 as indicated by arrow A. The interior chamber 335 contains a mixing medium 66, for example glass spheres 68, similar to the previous embodiment. The incoming solution flows through the foaming medium 66 and the foam flows out of the outlet 337. The foam is redirected by the closed end 306 to flow through the passage 311 to the outlet ports 309, as indicated by the arrows B and C. The manifold bead 308 distributes the foam to flow out of the outlet ports 309 as indicated by arrow D.

Either foam mixing chamber 40, 300 configuration can be employed in the "tank mixing" or "injection mixing" configurations. Furthermore, some applications can employ a combination of the two configurations. Both foaming chamber configurations are advantageous in that they provide for forming of a foam internally, i.e., without exposure to ambient conditions such as wind or excess water which may undesirably dilute the chemical formulation. Moreover, forming the foam at a location upstream from the dispensing nozzles, as disclosed herein, is beneficial in that it can provide additional dwell time for the formulation to mix or dissolve within the water. This additional dwell time provides a more consistent mixture and for a "fully developed" hydrodynamic flow profile to be established within conduit leading to the dispensing nozzles.

Referring to FIGS. 1 and 2, the foam stream exiting the foam mixing chamber 40, 300 is directed to a respective nozzle 84 for direct delivery within a respective planting furrow. A monitoring unit 70 and a control valve 80 are positioned along each specific line. The monitoring unit 70, as described above, is configured to monitor if a sufficient foam flow is passing therethrough. If the control module 12 receives a signal indicating that foam flow is not sufficient, the control module 12 can generate an alarm to alert an operator to check for blockages and/or a shut off signal to terminate the system operation. The control valves 80 are controlled by the control module 12 and can be control to close the row line to stop the stream of foam when the planter is, for example, stopped or turning. Additionally, the system can be configured such that the valve 80 is controlled for intermittent application of the foam. For example, the foam may be applied only directly to each seed and the flow stopped during the travel between seeds.

Figure 11:
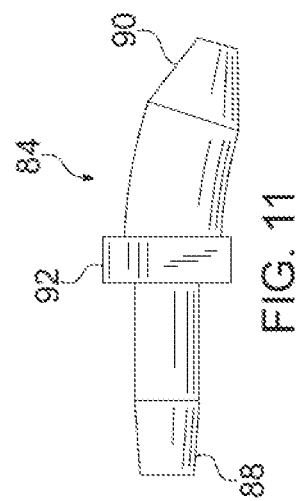
FIG. 11 is a side elevation view of the discharge nozzle of FIG. 10.
Figure 10:
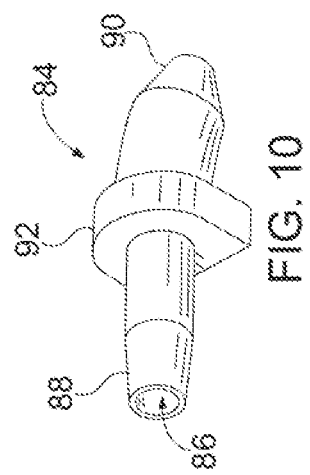
FIG. 10 is a perspective view of an exemplary discharge nozzle in accordance with an embodiment of the invention.
Figure 12:
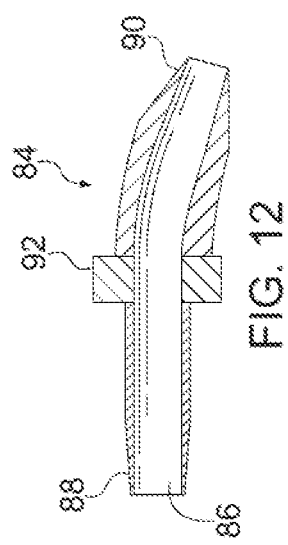
FIG. 12 is a cross-sectional view of the discharge nozzle of FIG. 10.

Referring to FIGS. 10-12, an exemplary dispensing nozzle 84 in accordance with an embodiment of the invention will be described. Each nozzle 84 includes an internal passage 86 extending from a proximate end 88 to a distal end 90. The proximate end 88 is configured with a diameter which allows the proximate end 88 to be readily inserted within the foaming line. The proximate end 92 can also be tapered or pointed to further ease the insertion of the nozzle into the foaming line. The nozzle 84 includes a flange 92 disposed between the two ends of the nozzle which serves as a stop member to prevent over-insertion of the nozzle within the foaming line.

The distal end 90 of the nozzle 84 acts as the dispensing orifice. The distal end 90 may include a sharp degree of taper which is beneficial in that in facilitates dispensing or release of the foam rope, as compared to blunt nozzle discharge orifices wherein the foam often clings to the nozzle and expand or grow to the size of that blunt end. An additional benefit of the tapered dispensing end 90 is that it does not reduce foam discharge velocity (as blunt orifices are known to do) and in some instances can serve to accelerate the velocity of the foam being dispensed, thereby providing a more continuous discharge rope within a furrow, particularly when the planter is traveling at high speeds.

In operation, the foam dispensing system described herein can be incorporated into a seed planting device such that the seed and foam are dispensed simultaneously. In such applications, the foam discharge nozzle can be located to dispense foam either in front of the seed tube or behind the seed tube depending on customer practices and preferences. In some applications it is beneficial to dispense the foam after the seed has been ejected from the planter so that the seed is ensured to make sufficient contact with the soil. In accordance with an aspect of the disclosure, the foaming discharge rate can be adjusted as needed in applications in which the foam is dispensed in advance of the seed to ensure that the proper amount of foam is deposited in the furrow so as to avoid over saturating or filling the furrow and "floating" the seed such that there is too little contact with the soil. Additionally, in some embodiments, the nozzle can be configured to articulate so as to provide a non-linear (e.g. zig-zag) rope of foam into the furrow. Furthermore, the valves within the lines can be operated independently to control the flow of water, air and/or chemical formulation to discharge foam on a continuous or intermittent basis, as so desired.

Flow Ranges

The apparatus and methods disclosed herein provide an optimal foaming system that is capable of operating over a range of speeds, while minimizing the volume of chemical formulation employed. For purpose of illustration and not limitation, some exemplary ranges include approximately 4-16 ounces of chemical formulation per acre, and 24-64 ounces of water per acre with a planter having a ground speed ranging from 2-7 miles per hour.

FIGS. 13-17 depict graphical representations of exemplary speeds and plantar width ranges of the delivery system 10 when using, for example, a 12-volt electric positive displacement pump. Other results may be achieved utilizing other equipment. The graphs represent the significant flexibility of the delivery system 10 by controlling the various components via the control module 12. With such flexibility, it is not necessary for the user to reconfigure the system each time operating conditions are varied.

Field Testing

In order to evaluate the foam formulations of the present invention within the presently described system, formulation containing bifenthrin were tested for assessing their ability to control Corn Rootworm feeding. As such, field trials were conducted in several locations across the Midwestern United States to evaluate the efficacy of Example 5 foam formulation insecticide compared to Capture® LFR® insecticide against Corn Rootworm (*Diabrotica* spp.)

The objective of these trials was to determine if the efficacy of Example 5 formulation is equal or better than the currently marketed by FMC Corporation, Capture® LFR® Insecticide which is a formulation that also contains bifenthrin as active ingredient; and a commercial Corn Rootworm standard treatment using Force® 3G, which contains tefluthrin insecticide distributed by AMVAC.

Test plots were prepared by preparing the test fields for planting followed by planting field corn and treating the planted furrows with either Capture® LFR® Insecticide with liquid fertilizer, Force® 3G insecticide or foam created using the formulation of Example 5 prior to covering the furrow. Untreated control test plots were also included. The data collected from five locations in the Midwest including Coleman, S.D., Concord, Nebr., Wyoming, Ill., Clay Center, Nebr. and Nashua, Iowa shown in the following Table A.

As evident, those of ordinary skill in the art can appreciate that the Example 5 formulation of the present invention had significantly lower corn rootworm feeding damage than the untreated. The Example 5 formulation further exhibited equal to or better than control of corn rootworm feeding than that of Capture®LFR® and Force® 3G. The level of feeding damage prevention was statistically equal to the comparative formulations (P<0.10, Duncan's New MRT).

TABLE A

Evaluation of Corn Rootworm management

| Treatment | Mean Corn Rootworm Root Rating by Location[1,2] | | | | |
|---|---|---|---|---|---|
| | Coleman | Concord | Wyoming, IL | Clay Center | Nashua |
| Untreated | 0.45 a | 0.42 a | 1.73 a | 0.81 a | 1.69 a |
| Capture ® LFR ® 0.1 lb ai/A + 8-24-0 liquid fertilizer Applied at 5 gal/A | 0.05 b | 0.19 bc | 0.98 b | 0.35 c | 0.73 b |
| Example 5; 0.1 lb ai/A in 48 oz total liquid volume per acre | 0.04 b | 0.2 bc | 0.76 bc | 0.47 bc | 0.95 b |
| Example 5; 0.1 lb ai/A in 32 oz total liquid volume per acre | NA | NA | 0.46 cd | 0.42 bc | NA |
| Force ® 3G 0.15 lb ai/A | 0.05 b | 0.09 c | 0.24 d | 0.49 bc | 1 b |

[1]Root ratings ISU 0-3 scale.
[2]Means followed by the same letter do not significantly differ (P = 0.10, Duncan's New MRT); data transformed arcsine square root per cent for analysis with original means displayed These results indicate that Example 5 formulation of bifenthrin applied at low total volume rates per acre (48 oz, and 32 oz./acre) provide corn rootworm feeding damage protection that is statistically equal to or bettor than Capture® LFR® applied at 5 gallons/acre of liquid fertilizer and statistically equal to Force® 3G.

The exemplary ranges and dimensions are provided herein merely for purposes of illustration and not limitation. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. For example in one embodiment, one of ordinary skill in the art can broaden the zone of protection in comparison to what could have been achieved with standard liquid applications. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A liquid agricultural formulation comprising:
an agriculturally active ingredient in a total amount of about 13% to about 40% by weight, selected from the group consisting of agricultural fungicides,
at least one foaming agent comprising an anionic surfactant, in a total concentration between about 0.1% and about 30% of the liquid agricultural formulation,
at least one foam stabilizer in a total concentration between about 0.1% and about 15% of the liquid agricultural formulation;
at least one dispersant wherein the dispersant comprises a phosphate ester; and
water;
wherein when the liquid agricultural formulation is used to form a foam, the foam generated by the formulation has a volume which is reduced by 25% after about 45 minutes or more.

2. The liquid agricultural formulation of claim 1, wherein the total concentration of foaming agent(s) in the liquid agricultural formulation is between about 5% and about 30% of the liquid agricultural formulation.

3. The liquid agricultural formulation of claim 1, wherein the total concentration of foam stabilizer(s) in the liquid agricultural formulation is between about 1% and about 15% of the liquid agricultural formulation.

4. The liquid agricultural formulation of claim 1, wherein the agriculturally active ingredient is an azole fungicide selected from the group consisting of bitertanol, bromuconazole, cyproconaole, difenoconazole, diniconazole, enilconazole, epoxiconazole, fluquinconazole, fenbuconazole, flusilazole, flutriafol, hexaconazole, imibenconazole, ipconazole, metconazole, myclobutanil, penconazole, propiconazole, prothioconazole, simeconazole, triadimefon, triadimenol, tebuconazole, tetraconazole, triticonazole, prochloraz, pefurazoate, imazalil, triflumizole, cyazofamid, benomyl, carbendazim, thiabendazole, fuberidazole, ethaboxam, etridiazole and hymexazole, azaconazole, diniconazole-M, oxpoconazol, paclobutrazol, uniconazol, 1-(4-chloro-phenyl)-2-([1,2,4]triazol-1-yl)-cycloheptanol and imazalilsulfphate.

5. The liquid agricultural formulation of claim 1, wherein the agriculturally active ingredient is flutriafol.

6. The liquid agricultural formulation of claim 1, wherein the agriculturally active ingredient is present in the liquid agricultural formulation in the form of a microemulsion, an oil-in-water concentrated emulsion, a suspension, a suspension concentrate, an emulsifiable concentrate, or a microencapsulate.

7. The liquid agricultural formulation of claim 6, wherein the agriculturally active ingredient is present in the liquid agricultural formulation in the form of a suspension concentrate.

8. The liquid agricultural formulation of claim 1, wherein the agriculturally active ingredient is present in a total concentration of about 17% to about 40% by weight of the liquid agricultural formulation.

9. The liquid agricultural formulation of claim 1, wherein the one or more foam stabilizers are present in a total concentration of about 7% to about 15% by weight of the liquid agricultural formulation.

10. The liquid agricultural formulation of claim 1, wherein the total concentration of the one or more foaming agents is about 17% to about 30% by weight of the liquid agricultural formulation.

11. A liquid agricultural formulation, comprising:
a) flutriafol;
b) sodium decyl sulfate as foaming agent;
c) glycerine as foam stabilizer;
d) 1,2-benzisothiazolin-3-one as preservative;
e) alkyl polyglucosides and phosphate esters as dispersants; and
f) water;
wherein when the liquid agricultural formulation is used to form a foam, the foam generated by the formulation has a volume which is reduced by 25% after 45 minutes or more.

12. The liquid agricultural formulation of claim 11, wherein flutriafol is present in about 13% to about 40% by weight of the liquid agricultural formulation; sodium decyl sulfate is present in about 0.1% to about 30% by weight of the liquid agricultural formulation; and glycerine is present in a total of about 0.1% to about 15% by weight of the liquid agricultural formulation.

13. An agricultural foam, comprising:
1) a liquid agricultural formulation comprising:
a) flutriafol;
b) sodium decyl sulfate as foaming agent;
c) glycerine as foam stabilizer;
d) 1,2-benzisothiazolin-3-one as preservative;
e) alkyl polyglucosides and phosphate esters as dispersants; and
f) water; and
2) a gas.

14. The agricultural foam of claim 13, wherein the liquid agricultural formulation contains about 13% to about 40% by weight of flutriafol; about 0.1% to about 30% by weight of sodium decyl sulfate, and about 0.1% to about 15% by weight of glycerine; and wherein the gas is air.

15. The agricultural foam of claim 14, wherein the total concentration of foaming agent(s) in the liquid agricultural formulation is between about 5% and about 30% by weight of the liquid agricultural formulation.

16. The agricultural foam of claim 14, wherein the total concentration of foam stabilizer(s) in the liquid agricultural formulation is between about 1% and about 15% by weight of the liquid agricultural formulation.

17. A method of creating an agricultural foam from a liquid agricultural formulation, comprising: mixing a liquid agricultural formulation and a gas under foaming conditions, wherein the liquid agricultural formulation comprises: an agriculturally active ingredient in a total amount of about 13% to about 40% by weight, selected from the group consisting of agricultural fungicides, at least one foaming agent comprising an anionic surfactant, in a total concentration between about 0.1% and about 30% by weight of the liquid agricultural formulation, at least one foam stabilizer in a total concentration between about 0.1% and about 15% by weight of the liquid agricultural formulation, at least one dispersant wherein the dispersant comprises a phosphate ester, and water; wherein the gas is air; and wherein the foam generated by the formulation has a volume which is reduced by 25% after about 45 minutes or more.

18. The method of claim 17, wherein the total concentration of foaming agent(s) in the liquid agricultural formulation is between about 5% and about 30% by weight of the liquid agricultural formulation.

19. The method of claim 17, wherein the total concentration of foam stabilizer(s) in the liquid agricultural formulation is between about 1% and about 15% by weight of the liquid agricultural formulation.

20. A method of applying an agricultural foam to seeds during planting in-furrow, comprising the steps of:
i) creating an agricultural foam from a liquid agricultural formulation and a gas, comprising
  a) mixing a liquid agricultural formulation and a compressed gas in a mixing chamber comprising a chamber body, and a foaming medium comprising a plurality of spheres, and
  b) passing the mixture through at least one conduit associated with an outlet to generate a foamed formulation;
wherein the liquid agricultural formulation comprises:
1) an agriculturally active ingredient selected from the group consisting of agricultural fungicides,
2) at least one foaming agent comprising an anionic surfactant, in a total concentration between about 0.1% and about 30% of the liquid agricultural formulation,
3) at least one foam stabilizer in a total concentration between about 0.1% and about 15% of the liquid agricultural formulation,
4) water,
and 5) at least one dispersant wherein the dispersant comprises a phosphate ester;
wherein the gas is air; and
wherein the foam generated by the formulation has a volume which is reduced by 25% after about 45 minutes or more, and ii) directly applying the agricultural foam to seeds as they are being planted in a furrow.

21. The method of claim 20, wherein the foam has an expansion factor between 15-80.

22. The method of claim 20, wherein the total concentration of foaming agent(s) in the liquid agricultural formulation is between about 5% and about 30% by weight of the liquid agricultural formulation.

23. The method of claim 20, wherein the total concentration of foam stabilizer(s) in the liquid agricultural formulation is between about 1% and about 15% by weight of the liquid agricultural formulation.

24. The method of claim 20, wherein the concentration of the agriculturally active ingredient is between about 13% and 40% by weight of the liquid agricultural formulation.

25. The method of claim 20, wherein the agriculturally active ingredient is an azole fungicide selected from the group consisting of bitertanol, bromuconazole, cyproconaole, difenoconazole, diniconazole, enilconazole, epoxiconazole, fluquinconazole, fenbuconazole, flusilazole, flutriafol, hexaconazole, imibenconazole, ipconazole, metconazole, myclobutanil, penconazole, propiconazole, prothioconazole, simeconazole, triadimefon, triadimenol, tebuconazole, tetraconazole, triticonazole, prochloraz, pefurazoate, imazalil, triflumizole, cyazofamid, benomyl, carbendazim, thiabendazole, fuberidazole, ethaboxam, etridiazole and hymexazole, azaconazole, diniconazole-M, oxpoconazol, paclobutrazol, uniconazol, 1-(4-chloro-phenyl)-2-([1,2,4]triazol-1-yl)-cycloheptanol and imazalilsulfphate.

26. The method of claim 20, wherein the agriculturally active ingredient is flutriafol.

* * * * *